(12) United States Patent
Lee et al.

(10) Patent No.: US 12,381,893 B2
(45) Date of Patent: Aug. 5, 2025

(54) RAPID DEVELOPMENT OF MALICIOUS CONTENT DETECTORS

(71) Applicant: Sophos Limited, Abingdon (GB)

(72) Inventors: Younghoo Lee, Asquith (AU); Joshua Daniel Saxe, Wichita, KS (US)

(73) Assignee: Sophos Limited, Abingdon (GB)

( * ) Notice: Subject to any disclaimer, the term of this patent is extended or adjusted under 35 U.S.C. 154(b) by 98 days.

(21) Appl. No.: 18/225,737

(22) Filed: Jul. 25, 2023

(65) Prior Publication Data

US 2024/0056458 A1 Feb. 15, 2024

Related U.S. Application Data

(60) Provisional application No. 63/396,476, filed on Aug. 9, 2022.

(51) Int. Cl.
*H04L 9/40* (2022.01)
*G06F 40/279* (2020.01)
*G06F 40/58* (2020.01)

(52) U.S. Cl.
CPC ........ *H04L 63/1416* (2013.01); *G06F 40/279* (2020.01); *G06F 40/58* (2020.01)

(58) Field of Classification Search
CPC ... H04L 63/1416; G06F 40/279; G06F 40/58; G06F 21/552; G06F 21/554; G06F 40/30; G06N 3/096; G06N 3/0455; G06N 3/0475; G06N 3/09
USPC ........................................................ 726/23
See application file for complete search history.

(56) References Cited

U.S. PATENT DOCUMENTS

| 12,153,671 B2* | 11/2024 | Kulaga | G06F 21/563 |
| 2016/0072830 A1* | 3/2016 | Goel | H04L 63/1441 726/23 |
| 2022/0094713 A1* | 3/2022 | Lee | G06F 18/214 |
| 2022/0263842 A1* | 8/2022 | Chen | H04L 61/5061 |
| 2022/0292261 A1* | 9/2022 | Movshovitz-Attias | G06F 40/289 |
| 2022/0330027 A1* | 10/2022 | Djukic | H04W 12/122 |

(Continued)

OTHER PUBLICATIONS

Demirci Deniz, et al., Static Malware Detection Using Stacked BILSTM and GPT-2, May 30, 2022, IEEE Access, pp. 58488-58502, vol. 10.

(Continued)

*Primary Examiner* — Badrinarayanan
*Assistant Examiner* — Badri Champakesan
(74) *Attorney, Agent, or Firm* — Cesari and McKenna, LLP

(57) ABSTRACT

Methods and systems are described for developing a malicious content detector to identify new malicious text content, such as phishing messages, malicious documents, and/or malicious web content. A computing device is used to generate input data which contains an instruction, examples of content, and content to be analyzed. The examples include malicious and benign content samples, designed to recognize similar malicious content. The computing device feeds this input into a generative language model, which produces text labels that indicate the maliciousness of the content to be analyzed. The methods and systems enable rapid development of security protection by leveraging a small number of malicious samples, instead of training with a large dataset of new training samples.

14 Claims, 18 Drawing Sheets

(56) References Cited

U.S. PATENT DOCUMENTS

| | | | | |
|---|---|---|---|---|
| 2023/0146636 A1* | 5/2023 | Kim | ................ | G06F 21/577 |
| | | | | 726/23 |
| 2023/0334246 A1* | 10/2023 | Vah | ................ | G06F 40/30 |
| 2024/0144935 A1* | 5/2024 | Martin | ................ | G10L 17/02 |
| 2024/0354500 A1* | 10/2024 | Vanatalu | ................ | G06F 40/30 |
| 2024/0372885 A1* | 11/2024 | Moore | ................ | G06F 40/56 |
| 2024/0386212 A1* | 11/2024 | Brad | ................ | H04L 51/02 |

OTHER PUBLICATIONS

Ahmed Muhammad Ejaz, et al., Peeler: Profiling Kernel-Level Events to Detect Ransomware, Sep. 30, 2021, pp. 240-260, Topics in Cryptology-CT-RSA 2020, The Cryptographer's Track at the RSA Conference 2020, San Francisco CA, USA, Feb. 24-28, 2020, Cornell University Library, 201 Olin Library Cornell University, Ithaca, NY 14853.

* cited by examiner

Command
cmd.exe /c copy C:\Windows\System32\rundll32.exe C:\Users\PCs\AppData\Local\Temp\adobe.exe

Tags
win_suspicious_copy_system32

Description
The above command will 1000
1010
1020

FIG. 10A

Command
cmd.exe /c copy C:\Windows\System32\rundll32.exe C:\Users\PCs\AppData\Local\Temp\adobe.exe

Tags
win_suspicious_copy_system32

Description
The above command will copy run32dll.exe to "C:\Users\PCs\AppData\Local\Temp\adobe.exe" where the attackers can use the run32dll.exe to perform malicious activity.

FIG. 10B

RAPID DEVELOPMENT OF MALICIOUS CONTENT DETECTORS

RELATED APPLICATIONS

This application claims priority to U.S. Provisional Patent Application No. 63/396,476, filed on Aug. 9, 2022, the entirety of which is incorporated herein by reference.

TECHNICAL FIELD

The subject matter of the application relates generally to methods and systems for detecting malicious content using generative natural language processing.

BACKGROUND

In the field of cybersecurity, when machine learning technology is used in commercial security products it is often developed with extensive research and analysis, and deeply embedded within the products. Development of useful models can be time consuming, and even if a model is developed quickly, it may be difficult for an analyst or a customer to rapidly add a machine learning classifier to an existing product or workflow. This can make it difficult for cybersecurity analysts to rapidly create, share, improve upon, and deploy machine learning models within cybersecurity infrastructure.

SUMMARY

In general, it may be beneficial to provide a rapidly developed and rapidly deployed machine learning classifier capable of recognizing a new malicious content or family of malicious content. The classifier may be quickly developed using a relatively small number of examples and may be easily distributed and quickly used in cybersecurity infrastructure. After initial distribution, the classifier may be refined, updated, and replaced. This allows for rapid development and distribution of an initial level of protection soon after identification of new threats, and for updating and improvement over time.

In general, it may be beneficial to provide the power of a machine learning model in the form of a generative natural language model and selected samples. The use of a generative natural language model and selected samples enables the rapid generation and distribution of a new machine-learning-powered classifier, for example for use in recognizing new malicious content, or for customized content such as malicious content associated with a specific attack or attacker, targeted at specific networks, types of networks, types of organizations, or other scenarios in which a rapidly developed or customized classifier could be put to use. In some cases, a rapidly developed classifier may not be as sensitive or robust as a classifier that was developed with more research over a longer period of time and with more samples or test data. Also, such a classifier may use significantly more resources and take more time to run than a classifier that was developed over a longer period of time using more initial development resources. However, there are scenarios where having a less sensitive or less robust classifier that is not as efficient but can be rapidly developed and deployed can provide great benefit to a network administrator or cybersecurity analyst. As just one example, using machine learning detectors to recognize content similar to recently identified samples can enable administrators and analysts to defend networks more effectively.

In general, a malicious content detector may be implemented as a generative natural language classifier and selected text content samples. For example, in an implementation, a small number of text content samples may be classified as malicious content or benign content. The small number of text content samples may be provided along with target content to a generative natural language model in a format suitable for input to the generative natural language model. The generative natural language model may be used with the small number of text content samples as a classifier of malicious content to classify the target content. When the classifier based on the generative natural language model indicates that the target content is malicious, the target content may be treated as malicious by a cybersecurity system. For example, the content may be quarantined or blocked.

In some implementations, treating target content as malicious may include blocking the target content, quarantining the target content, alerting an administrator or analyst, queuing the target content for additional analysis, or performing additional analysis. In some implementations, the selected text content samples may be a small number of samples. For example, the number of text content samples may be less than 1000, less than 500, less than 100, less than 50, less than 20, less than 10, or less than five. In some implementations, the malicious content detector may be implemented in a detection pipeline for detection of malicious content. In some implementations, the generative natural language model may be GPT-3®, available from OpenAI®. In some implementations, the generative natural language model may be Open Pretrained Transformer (OPT-175B), available from Meta™. In some implementations text content samples may be included in an input file with target content samples. In some implementations, the samples and target content are provided as an autocomplete prompt.

In general, in an aspect, a method for detection of malicious content may include receiving target content and processing the target content in a pipeline that includes convicting some content as malicious and accepting some content as benign. When target content is not convicted as malicious and not accepted as benign, the target content may be checked using a detector using a classifier based on a generative natural language model and selected text content samples. When the detector indicates that the content is malicious, the target content may be treated as malicious.

In general, in an aspect, a computer program product may include computer readable code embodied in a non-transitory computer readable medium that when executing performs steps that may include providing a small number of text content samples and target content to a generative natural language model in a format suitable as input to the generative natural language model, running the generative natural language model with the small number of text content samples and the target content as input to the generative natural language model, and when the generative natural language model indicates that target content is malicious, treating the content as malicious.

In general, in an implementation, a method may include identifying a number of content samples as malicious content. The method may include providing the number of content samples along with target content to a generative natural language model in a format suitable for input to the natural language model. The method may include causing the natural language model to undertake a prediction problem using the content samples and target content. The method may include taking a security action when the model convicts the target content.

In general, in an implementation, a computer program product including computer readable code embodied in a non-transitory computer readable medium includes a detector suitable for inclusion in a malicious content detection pipeline. The detector may include instructions for providing a number of content samples along with target content to a generative natural language model in a format suitable for input to the natural language model. The detector may include instructions for causing the natural language model to undertake a prediction problem using the content samples and target content. The detector may include instructions for interpreting the output of the natural language model. The detector may include instructions for taking a security action when the model output convicts the target content.

In general, in an implementation, a method for detection of malicious content may include receiving target content. The method may include processing target content in a pipeline that includes convicting content as malicious and accepting content as benign. The method may include, when content is not determined to be malicious and not determined to be benign, using a detector implemented as a prediction problem for a generative natural language model to check the content. The method may include taking a security action when the detector indicates that the content is malicious.

In general, in an aspect, a method of detecting malicious content in text messages using generative natural language processing may include generating a number of sample text messages from a corpus of stored text messages by selecting one or more first text messages classified as malicious and selecting one or more second text messages classified as benign. The method may include identifying one or more target text messages to be labeled as malicious or benign, the target text messages received from a remote device. The method may include providing the number of sample text messages and the target text messages to a generative natural language model programming interface in a format compatible as input to a generative natural language model, the model comprising a transformer-based neural network architecture trained to generate text output using an input prompt. The method may include causing the generative natural language model to generate a predicted label for each of the target text messages by comparing one or more features of the target text messages to one or more features of the classified sample text messages. The method may include executing a security action directed to one or more of the target text messages when the predicted label for the target text message indicates that the target text message is malicious.

In general, in an aspect, a system for detecting malicious content in text messages using generative natural language processing may include a computing device configured to generate a number of sample text messages from a corpus of stored text messages by selecting one or more first text messages classified as malicious and selecting one or more second text messages classified as benign. The computing device may be configured to identify one or more target text messages to be labeled as malicious or benign, the target text messages received from a remote device. The computing device may be configured to provide the number of sample text messages and the target text messages to a generative natural language model programming interface in a format compatible as input to a generative natural language model, the model comprising a transformer-based neural network architecture trained to generate text output using an input prompt. The computing device may be configured to cause the generative natural language model to generate a predicted label for each of the target text messages by comparing one or more features of the target text messages to one or more features of the classified sample text messages. The computing device may be configured to execute a security action directed to one or more of the target text messages when the predicted label for the target text message indicates that the target text message is malicious.

In some implementations, the security action comprises blocking the content, quarantining the content, alerting an administrator, alerting an analyst, or designating the content for additional analysis. In some implementations, each sample text message classified as malicious is assigned a first label, and each sample text message classified as benign is assigned a second label. In some implementations, providing the number of sample text messages and the target text messages to the generative natural language model programming interface comprises providing the labels associated with each of the sample text messages to the generative natural language model programming interface.

In some implementations, the computing device provides a task description along with the number of sample text messages and the target text messages to the generative natural language model programming interface. In some implementations, the task description comprises an instruction to the generative natural language model to guide analysis of the sample text messages and generation of the predicted label for each of the target text messages In general, in an aspect, a method of translating command line code using generative natural language processing may include analyzing target command line code to identify one or more tags for the target command line code. The method may include providing the target command line code and the tags to a generative natural language model programming interface in a format compatible as input to a generative natural language model, the model comprising a transformer-based neural network architecture trained to generate text output using an input prompt. The method may include causing the natural language model to translate the target command line code and the tags into a natural language description of the target command line code. The method may include providing the natural language description to a remote computing device.

In general, in an aspect, a system for translating command line code using generative natural language processing may include a computing device configured to analyze target command line code to identify one or more tags for the target command line code. The computing device may be configured to provide the target command line code and the tags to a generative natural language model programming interface in a format compatible as input to a generative natural language model, the model comprising a transformer-based neural network architecture trained to generate text output using an input prompt. The computing device may be configured to cause the natural language model to translate the target command line code and the tags into a natural language description of the target command line code. The computing device may be configured to provide the natural language description to a remote computing device.

In some implementations, the natural language description and the tags are provided to the generative natural language model programming interface in a format suitable for input to the generative natural language model, the natural language model translates the natural language description and the tags into one or more command line code candidates, the target command line code is compared to each of the command line code candidates using a similarity measure, and the command line code candidates are ranked based upon the similarity measures. In some implementations, a command identifier is provided along with the natural language description and the tags to the generative natural language model programming interface. In some implementations, the command identifier guides the generative natural language model during generation of the command line code candidates.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIGS. 10A & 10B illustrate another input dataset, in accordance with an example embodiment, for generating human-readable explanations of command lines using the malicious content detector.

DETAILED DESCRIPTION

Figure 1:
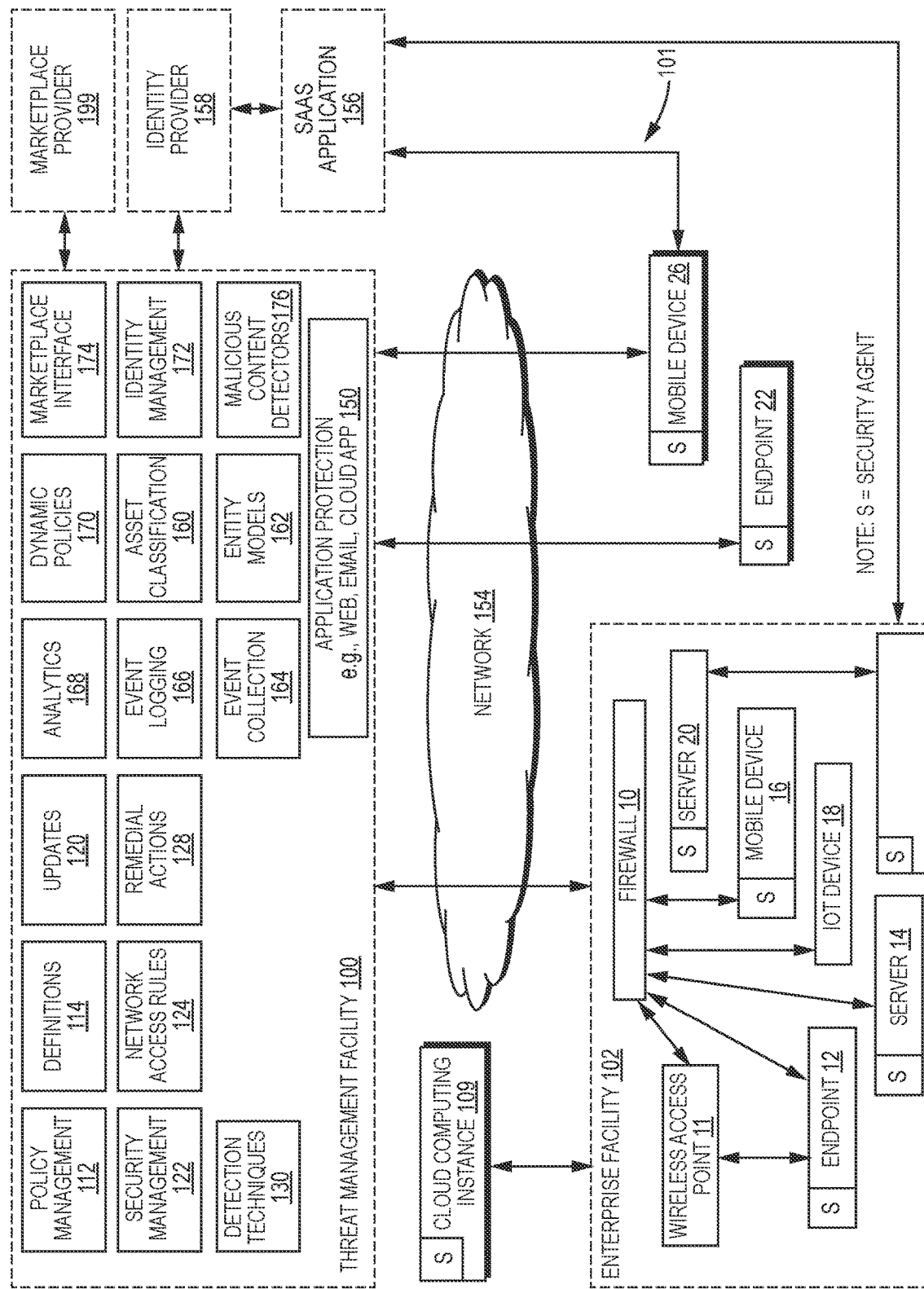
FIG. 1 depicts a block diagram of a threat management system, according to one example embodiment.

Embodiments will now be described with reference to the accompanying figures. The foregoing may, however, be embodied in many different forms and should not be construed as limited to the illustrated embodiments set forth herein.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately" or the like, when accompanying a numerical value, are to be construed as indicating a deviation as would be appreciated by one of ordinary skill in the art to operate satisfactorily for an intended purpose. Similarly, words of approximation such as "approximately" or "substantially" when used in reference to physical characteristics, should be understood to contemplate a range of deviations that would be appreciated by one of ordinary skill in the art to operate satisfactorily for a corresponding use, function, purpose, or the like. Ranges of values and/or numeric values are provided herein as examples only, and do not constitute a limitation on the scope of the described embodiments. Where ranges of values are provided, they are also intended to include each value within the range as if set forth individually, unless expressly stated to the contrary. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the following description, it is understood that terms such as "first," "second," "top," "bottom," "up," "down," and the like, are words of convenience and are not to be construed as limiting terms.

It should also be understood that endpoints, devices, compute instances or the like that are referred to as "within" an enterprise network may also be "associated with" the enterprise network, e.g., where such assets are outside an enterprise gateway but nonetheless managed by or in communication with a threat management facility or other centralized security platform for the enterprise network. Thus, any description referring to an asset within the enterprise network should be understood to contemplate a similar asset associated with the enterprise network regardless of location in a network environment unless a different meaning is explicitly provided or otherwise clear from the context.

The technology described herein provides methods and systems for quickly developing a malicious content detector to identify new malicious text content—including but not limited to phishing messages, malicious documents, and/or malicious web content. In some embodiments, a computing device is used to generate input data which contains an instruction (or prompt), examples of content, and content to be analyzed. The instruction and examples include a few new malicious and benign samples, designed to recognize similar malicious content. The computing device then feeds this input into a generative language model, which produces text labels that indicate the maliciousness of the content to be analyzed. Beneficially, the technology described herein enables rapid development of security protection because the technology can leverage a small number of malicious samples, instead of currently available malicious content detection systems which may require machine learning training with a large dataset of new training samples.

Also described herein are methods and systems for detecting malicious content in text messages using generative natural language processing. A computing device generates a number of sample text messages from stored text messages by selecting one or more first text messages classified as malicious and selecting one or more second text messages classified as benign. The computing device identifies target text messages to be labeled as malicious or benign and provides the number of sample text messages and the target text messages to a programming interface in a format compatible as input to a generative natural language model. The computing device causes the model to generate a predicted label for each target text message. The computing device executes a security action directed to the target text message when the predicted label indicates that the message is malicious.

FIG. 1 depicts a block diagram of a threat management system 101 providing protection against a plurality of threats, such as malware, viruses, spyware, cryptoware, adware, Trojans, spam, intrusion, policy abuse, improper configuration, vulnerabilities, improper access, uncontrolled access, and more. A threat management facility 100 may communicate with, coordinate, and control operation of security functionality at different control points, layers, and levels within the system 101. A number of capabilities may be provided by a threat management facility 100, with an overall goal to intelligently use the breadth and depth of information that is available about the operation and activity of compute instances and networks as well as a variety of available controls. Another overall goal is to provide protection needed by an organization that is dynamic and able to adapt to changes in compute instances and new threats. In embodiments, the threat management facility 100 may provide protection from a variety of threats to a variety of compute instances in a variety of locations and network configurations.

As just one example, users of the threat management facility 100 may define and enforce policies that control access to and use of compute instances, networks and data. Administrators may update policies such as by designating authorized users and conditions for use and access. The threat management facility 100 may update and enforce those policies at various levels of control that are available, such as by directing compute instances to control the network traffic that is allowed to traverse firewalls and wireless access points, applications and data available from servers, applications and data permitted to be accessed by endpoints, and network resources and data permitted to be run and used by endpoints. The threat management facility 100 may provide many different services, and policy management may be offered as one of the services.

Turning to a description of certain capabilities and components of the threat management system 101, an exemplary enterprise facility 102 may be or may include any networked computer-based infrastructure. For example, enterprise facility 102 may be corporate, commercial, organizational, educational, governmental, or the like. As home networks get more complicated and include more compute instances at home and in the cloud, an enterprise facility 102 may also or instead include a personal network such as a home or a group of homes. The enterprise facility's 102 computer network may be distributed amongst a plurality of physical premises, such as buildings on a campus, and located in one or in a plurality of geographical locations. The configuration of the enterprise facility as shown is merely exemplary, and it will be understood that there may be any number of compute instances, less or more of each type of compute instances, and other types of compute instances. As shown, the exemplary enterprise facility includes a firewall 10, a wireless access point 11, an endpoint 12, a server 14, a mobile device 16, an appliance or IOT device 18, a cloud computing instance 19, and a server 20. Again, the compute instances 10-20 depicted are exemplary, and there may be any number or types of compute instances 10-20 in a given enterprise facility. For example, in addition to the elements depicted in the enterprise facility 102, there may be one or more gateways, bridges, wired networks, wireless networks, virtual private networks, other compute instances, and so on.

The threat management facility 100 may include certain facilities, such as a policy management facility 112, security management facility 122, update facility 120, definitions facility 114, network access rules facility 124, remedial action facility 128, detection techniques facility 130, application protection facility 150, asset classification facility 160, entity model facility 162, event collection facility 164, event logging facility 166, analytics facility 168, dynamic policies facility 170, identity management facility 172, marketplace management facility 174, and malicious content detector 176 as well as other facilities. For example, there may be a testing facility, a threat research facility, and other facilities. It should be understood that the threat management facility 100 may be implemented in whole or in part on a number of different compute instances, with some parts of the threat management facility on different compute instances in different locations. For example, some or all of one or more of the various facilities 100, 112-176 may be provided as part of a security agent S that is included in software running on a compute instance 10-26 within the enterprise facility. Some or all of one or more of the facilities 100, 112-176 may be provided on the same physical hardware or logical resource as a gateway, such as a firewall 10, or wireless access point 11. Some or all of one or more of the facilities may be provided on one or more cloud servers that are operated by the enterprise or by a security service provider, such as the cloud computing instance 109.

In embodiments, a marketplace provider 199 may make available one or more additional facilities to the enterprise facility 102 via the threat management facility 100. The marketplace provider may communicate with the threat management facility 100 via the marketplace interface facility 174 to provide additional functionality or capabilities to the threat management facility 100 and compute instances 10-26. As non-limiting examples, the marketplace provider 199 may be a third-party information provider, such as a physical security event provider; the marketplace provider 199 may be a system provider, such as a human resources system provider or a fraud detection system provider; the marketplace provider may be a specialized analytics provider; and so on. The marketplace provider 199, with appropriate permissions and authorization, may receive and send events, observations, inferences, controls, convictions, policy violations, or other information to the threat management facility. For example, the marketplace provider 199 may subscribe to and receive certain events, and in response, based on the received events and other events available to the marketplace provider 199, send inferences to the marketplace interface, and in turn to the analytics facility 168, which in turn may be used by the security management facility 122.

The identity provider 158 may be any remote identity management system or the like configured to communicate with an identity management facility 172, e.g., to confirm identity of a user as well as provide or receive other information about users that may be useful to protect against threats. In general, the identity provider may be any system or entity that creates, maintains, and manages identity information for principals while providing authentication services to relying party applications, e.g., within a federation or distributed network. The identity provider may, for example, offer user authentication as a service, where other applications, such as web applications, outsource the user authentication step to a trusted identity provider.

In embodiments, the identity provider 158 may provide user identity information, such as multi-factor authentication, to a SaaS application. Centralized identity providers such as Microsoft Azure™, may be used by an enterprise facility instead of maintaining separate identity information for each application or group of applications, and as a centralized point for integrating multifactor authentication. In embodiments, the identity management facility 172 may communicate hygiene, or security risk information, to the identity provider 158. The identity management facility 172 may determine a risk score for a user based on the events, observations, and inferences about that user and the compute instances associated with the user. If a user is perceived as risky, the identity management facility 172 can inform the identity provider 158, and the identity provider 158 may take steps to address the potential risk, such as to confirm the identity of the user, confirm that the user has approved the SaaS application access, remediate the user's system, or such other steps as may be useful.

In embodiments, threat protection provided by the threat management facility 100 may extend beyond the network boundaries of the enterprise facility 102 to include clients (or client facilities) such as an endpoint 22 outside the enterprise facility 102, a mobile device 26, a cloud computing instance 109, or any other devices, services or the like that use network connectivity not directly associated with or controlled by the enterprise facility 102, such as a mobile network, a public cloud network, or a wireless network at a hotel or coffee shop. While threats may come from a variety of sources, such as from network threats, physical proximity threats, secondary location threats, the compute instances 10-26 may be protected from threats even when a compute instance 10-26 is not connected to the enterprise facility 102 network, such as when compute instances 22, 26 use a network that is outside of the enterprise facility 102 and separated from the enterprise facility 102, e.g., by a gateway, a public network, and so forth.

In some implementations, compute instances 10-26 may communicate with cloud applications, such as a SaaS application 156. The SaaS application 156 may be an application that is used by but not operated by the enterprise facility 102. Exemplary commercially available SaaS applications 156 include Salesforce™, Amazon Web Services™ (AWS) applications, Google Apps™ applications, Microsoft Office 365™ applications and so on. A given SaaS application 156 may communicate with an identity provider 158 to verify user identity consistent with the requirements of the enterprise facility 102. The compute instances 10-26 may communicate with an unprotected server (not shown) such as a web site or a third-party application through an internetwork 154 such as the Internet or any other public network, private network, or combination of these.

In embodiments, aspects of the threat management facility 100 may be provided as a stand-alone solution. In other embodiments, aspects of the threat management facility 100 may be integrated into a third-party product. An application programming interface (e.g. a source code interface) may be provided such that aspects of the threat management facility 100 may be integrated into or used by or with other applications. For instance, the threat management facility 100 may be stand-alone in that it provides direct threat protection to an enterprise or computer resource, where protection is subscribed to directly. Alternatively, the threat management facility may offer protection indirectly, through a third-party product, where an enterprise may subscribe to services through the third-party product, and threat protection to the enterprise may be provided by the threat management facility 100 through the third-party product.

The security management facility 122 may provide protection from a variety of threats by providing, as non-limiting examples, endpoint security and control, email security and control, web security and control, reputation-based filtering, machine learning classification, control of unauthorized users, control of guest and non-compliant computers, and more.

The security management facility 122 may provide malicious code protection to a compute instance. The security management facility 122 may include functionality to scan applications, files, and data for malicious code, remove or quarantine applications and files, prevent certain actions, perform remedial actions, as well as other security measures. Scanning may use any of a variety of techniques, including without limitation signatures, identities, classifiers, and other suitable scanning techniques. In embodiments, the scanning may include scanning some or all files on a periodic basis, scanning an application when the application is executed, scanning data transmitted to or from a device, scanning in response to predetermined actions or combinations of actions, and so forth. The scanning of applications, files, and data may be performed to detect known or unknown malicious code or unwanted applications. Aspects of the malicious code protection may be provided, for example, in the security agent of an endpoint 12, in a wireless access point 11 or firewall 10, as part of application protection 150 provided by the cloud, and so on.

In an embodiment, the security management facility 122 may provide for email security and control, for example to target spam, viruses, spyware, and phishing, to control email content, and the like. Email security and control may protect against inbound and outbound threats, protect email infrastructure, prevent data leakage, provide spam filtering, and more. Aspects of the email security and control may be provided, for example, in the security agent of an endpoint 12, in a wireless access point 11 or firewall 10, as part of application protection 150 provided by the cloud, and so on.

In an embodiment, security management facility 122 may provide for web security and control, for example, to detect or block viruses, spyware, malware, unwanted applications, help control web browsing, and the like, which may provide comprehensive web access control enabling safe, productive web browsing. Web security and control may provide Internet use policies, reporting on suspect compute instances, security and content filtering, active monitoring of network traffic, URI filtering, and the like. Aspects of the web security and control may be provided, for example, in the security agent of an endpoint 12, in a wireless access point 11 or firewall 10, as part of application protection 150 provided by the cloud, and so on.

In an embodiment, the security management facility 122 may provide for network access control, which generally controls access to and use of network connections. Network control may stop unauthorized, guest, or non-compliant systems from accessing networks, and may control network traffic that is not otherwise controlled at the client level. In addition, network access control may control access to virtual private networks (VPN), where VPNs may, for example, include communications networks tunneled through other networks and establishing logical connections acting as virtual networks. In embodiments, a VPN may be treated in the same manner as a physical network. Aspects of network access control may be provided, for example, in the security agent of an endpoint 12, in a wireless access point 11 or firewall 10, as part of application protection 150 provided by the cloud, e.g., from the threat management facility 100 or other network resource(s).

In an embodiment, the security management facility 122 may provide for host intrusion prevention through behavioral monitoring and/or runtime monitoring, which may guard against unknown threats by analyzing application behavior before or as an application runs. This may include monitoring code behavior, application programming interface calls made to libraries or to the operating system, or otherwise monitoring application activities. Monitored activities may include, for example, reading and writing to memory, reading and writing to disk, network communication, process interaction, and so on. Behavior and runtime monitoring may intervene if code is deemed to be acting in a manner that is suspicious or malicious. Aspects of behavior and runtime monitoring may be provided, for example, in the security agent of an endpoint 12, in a wireless access point 11 or firewall 10, as part of application protection 150 provided by the cloud, and so on.

In an embodiment, the security management facility 122 may provide for reputation filtering, which may target or identify sources of known malware. For instance, reputation filtering may include lists of URIs of known sources of malware or known suspicious IP addresses, code authors, code signers, or domains, that when detected may invoke an action by the threat management facility 100. Based on reputation, potential threat sources may be blocked, quarantined, restricted, monitored, or some combination of these, before an exchange of data can be made. Aspects of reputation filtering may be provided, for example, in the security agent of an endpoint 12, in a wireless access point 11 or firewall 10, as part of application protection 150 provided by the cloud, and so on. In embodiments, some reputation information may be stored on a compute instance 10-26, and other reputation data available through cloud lookups to an application protection lookup database, such as may be provided by application protection 150.

In embodiments, information may be sent from the enterprise facility 102 to a third party, such as a security vendor, or the like, which may lead to improved performance of the threat management facility 100. In general, feedback may be useful for any aspect of threat detection. For example, the types, times, and number of virus interactions that an enterprise facility 102 experiences may provide useful information for the preventions of future virus threats. Feedback may also be associated with behaviors of individuals within the enterprise, such as being associated with most common violations of policy, network access, unauthorized application loading, unauthorized external device use, and the like. In embodiments, feedback may enable the evaluation or profiling of client actions that are violations of policy that may provide a predictive model for the improvement of enterprise policies.

An update management facility 120 may provide control over when updates are performed. The updates may be automatically transmitted, manually transmitted, or some combination of these. Updates may include software, definitions, reputations or other code or data that may be useful to the various facilities. For example, the update facility 120 may manage receiving updates from a provider, distribution of updates to enterprise facility 102 networks and compute instances, or the like. In embodiments, updates may be provided to the enterprise facility's 102 network, where one or more compute instances on the enterprise facility's 102 network may distribute updates to other compute instances.

The threat management facility 100 may include a policy management facility 112 that manages rules or policies for the enterprise facility 102. Exemplary rules include access permissions associated with networks, applications, compute instances, users, content, data, and the like. The policy management facility 112 may use a database, a text file, other data store, or a combination to store policies. In an embodiment, a policy database may include a block list, a black list, an allowed list, a white list, and more. As a few non-limiting examples, policies may include a list of enterprise facility 102 external network locations/applications that may or may not be accessed by compute instances, a list of types/classifications of network locations or applications that may or may not be accessed by compute instances, and contextual rules to evaluate whether the lists apply. For example, there may be a rule that does not permit access to sporting websites. When a website is requested by the client facility, a security management facility 122 may access the rules within a policy facility to determine if the requested access is related to a sporting website.

The policy management facility 112 may include access rules and policies that are distributed to maintain control of access by the compute instances 10-26 to network resources. Exemplary policies may be defined for an enterprise facility, application type, subset of application capabilities, organization hierarchy, compute instance type, user type, network location, time of day, connection type, or any other suitable definition. Policies may be maintained through the threat management facility 100, in association with a third party, or the like. For example, a policy may restrict instant messaging (IM) activity by limiting such activity to support personnel when communicating with customers. More generally, this may allow communication for departments as necessary or helpful for department functions but may otherwise preserve network bandwidth for other activities by restricting the use of IM to personnel that need access for a specific purpose. In an embodiment, the policy management facility 112 may be a stand-alone application, may be part of the network server facility 142, may be part of the enterprise facility 102 network, may be part of the client facility, or any suitable combination of these.

The policy management facility 112 may include dynamic policies that use contextual or other information to make security decisions. As described herein, the dynamic policies facility 170 may generate policies dynamically based on observations and inferences made by the analytics facility. The dynamic policies generated by the dynamic policy facility 170 may be provided by the policy management facility 112 to the security management facility 122 for enforcement.

In embodiments, the threat management facility 100 may provide configuration management as an aspect of the policy management facility 112, the security management facility 122, or some combination. Configuration management may define acceptable or required configurations for the compute instances 10-26, applications, operating systems, hardware, or other assets, and manage changes to these configurations. Assessment of a configuration may be made against standard configuration policies, detection of configuration changes, remediation of improper configurations, application of new configurations, and so on. An enterprise facility may have a set of standard configuration rules and policies for particular compute instances which may represent a desired state of the compute instance. For example, on a given compute instance 12, 14, 18, a version of a client firewall may be required to be running and installed. If the required version is installed but in a disabled state, the policy violation may prevent access to data or network resources. A remediation may be to enable the firewall. In another example, a configuration policy may disallow the use of USB disks, and policy management 112 may require a configuration that turns off USB drive access via a registry key of a compute instance. Aspects of configuration management may be provided, for example, in the security agent of an endpoint 12, in a wireless access point 11 or firewall 10, as part of application protection 150 provided by the cloud, or any combination of these.

In embodiments, the threat management facility 100 may also provide for the isolation or removal of certain applications that are not desired or may interfere with the operation of a compute instance 10-26 or the threat management facility 100, even if such application is not malware per se. The operation of such products may be considered a configuration violation. The removal of such products may be initiated automatically whenever such products are detected, or access to data and network resources may be restricted when they are installed and running. In the case where such applications are services which are provided indirectly through a third-party product, the applicable application or processes may be suspended until action is taken to remove or disable the third-party product.

The policy management facility 112 may also require update management (e.g., as provided by the update facility 120). Update management for the security facility 122 and policy management facility 112 may be provided directly by the threat management facility 100, or, for example, by a hosted system. In embodiments, the threat management facility 100 may also provide for patch management, where a patch may be an update to an operating system, an application, a system tool, or the like, where one of the reasons for the patch is to reduce vulnerability to threats.

In embodiments, the security facility 122 and policy management facility 112 may push information to the enterprise facility 102 network and/or the compute instances 10-26, the enterprise facility 102 network and/or compute instances 10-26 may pull information from the security facility 122 and policy management facility 112, or there may be a combination of pushing and pulling of information. For example, the enterprise facility 102 network and/or compute instances 10-26 may pull update information from the security facility 122 and policy management facility 112 via the update facility 120, an update request may be based on a time period, by a certain time, by a date, on demand, or the like. In another example, the security facility 122 and policy management facility 112 may push the information to the enterprise facility's 102 network and/or compute instances 10-26 by providing notification that there are updates available for download and/or transmitting the information. In an embodiment, the policy management facility 112 and the security facility 122 may work in concert with the update management facility 120 to provide information to the enterprise facility's 102 network and/or compute instances 10-26. In various embodiments, policy updates, security updates and other updates may be provided by the same or different modules, which may be the same or separate from a security agent running on one of the compute instances 10-26.

As threats are identified and characterized, the definition facility 114 of the threat management facility 100 may manage definitions used to detect and remediate threats. For example, identity definitions may be used for scanning files, applications, data streams, etc. for the determination of malicious code. Identity definitions may include instructions and data that can be parsed and acted upon for recognizing features of known or potentially malicious code. Definitions also may include, for example, code or data to be used in a classifier, such as a neural network or other classifier that may be trained using machine learning. Updated code or data may be used by the classifier to classify threats. In embodiments, the threat management facility 100 and the compute instances 10-26 may be provided with new definitions periodically to include most recent threats. Updating of definitions may be managed by the update facility 120, and may be performed upon request from one of the compute instances 10-26, upon a push, or some combination. Updates may be performed upon a time period, on demand from a device 10-26, upon determination of an important new definition or a number of definitions, and so on.

A threat research facility (not shown) may provide a continuously ongoing effort to maintain the threat protection capabilities of the threat management facility 100 in light of continuous generation of new or evolved forms of malware. Threat research may be provided by researchers and analysts working on known threats, in the form of policies, definitions, remedial actions, and so on.

The security management facility 122 may scan an outgoing file and verify that the outgoing file is permitted to be transmitted according to policies. By checking outgoing files, the security management facility 122 may be able discover threats that were not detected on one of the compute instances 10-26, or policy violation, such transmittal of information that should not be communicated unencrypted.

The threat management facility 100 may control access to the enterprise facility 102 networks. A network access facility 124 may restrict access to certain applications, networks, files, printers, servers, databases, and so on. In addition, the network access facility 124 may restrict user access under certain conditions, such as the user's location, usage history, need to know, job position, connection type, time of day, method of authentication, client-system configuration, or the like. Network access policies may be provided by the policy management facility 112, and may be developed by the enterprise facility 102, or pre-packaged by a supplier. Network access facility 124 may determine if a given compute instance 10-22 should be granted access to a requested network location, e.g., inside or outside of the enterprise facility 102. Network access facility 124 may determine if a compute instance 22, 26 such as a device outside the enterprise facility 102 may access the enterprise facility 102. For example, in some cases, the policies may require that when certain policy violations are detected, certain network access is denied. The network access facility 124 may communicate remedial actions that are necessary or helpful to bring a device back into compliance with policy as described below with respect to the remedial action facility 128. Aspects of the network access facility 124 may be provided, for example, in the security agent of the endpoint 12, in a wireless access point 11, in a firewall 10, as part of application protection 150 provided by the cloud, and so on.

In an embodiment, the network access facility 124 may have access to policies that include one or more of a block list, a blacklist, an allowed list, a whitelist, an unacceptable network site database, an acceptable network site database, a network site reputation database, or the like of network access locations that may or may not be accessed by the client facility. Additionally, the network access facility 124 may use rule evaluation to parse network access requests and apply policies. The network access rule facility 124 may have a generic set of policies for all compute instances, such as denying access to certain types of websites, controlling instant messenger accesses, or the like. Rule evaluation may include regular expression rule evaluation, or other rule evaluation method(s) for interpreting the network access request and comparing the interpretation to established rules for network access. Classifiers may be used, such as neural network classifiers or other classifiers that may be trained by machine learning.

The threat management facility 100 may include an asset classification facility 160. The asset classification facility will discover the assets present in the enterprise facility 102. A compute instance such as any of the compute instances 10-26 described herein may be characterized as a stack of assets. The one level asset is an item of physical hardware. The compute instance may be, or may be implemented on physical hardware, and may have or may not have a hypervisor, or may be an asset managed by a hypervisor. The compute instance may have an operating system (e.g., Windows™, MacOS™, Linux™, Android™, iOS™). The compute instance may have one or more layers of containers. The compute instance may have one or more applications, which may be native applications, e.g., for a physical asset or virtual machine, or running in containers within a computing environment on a physical asset or virtual machine, and those applications may link libraries or other code or the like, e.g., for a user interface, cryptography, communications, device drivers, mathematical or analytical functions and so forth. The stack may also interact with data. The stack may also or instead interact with users, and so users may be considered assets.

The threat management facility may include entity models 162. The entity models may be used, for example, to determine the events that are generated by assets. For example, some operating systems may provide useful information for detecting or identifying events. For examples, operating systems may provide process and usage information that accessed through an API. As another example, it may be possible to instrument certain containers to monitor the activity of applications running on them. As another example, entity models for users may define roles, groups, permitted activities and other attributes.

The event collection facility 164 may be used to collect events from any of a wide variety of sensors that may provide relevant events from an asset, such as sensors on any of the compute instances 10-26, the application protection facility 150, a cloud computing instance 109 and so on. The events that may be collected may be determined by the entity models. There may be a variety of events collected. Events may include, for example, events generated by the enterprise facility 102 or the compute instances 10-26, such as by monitoring streaming data through a gateway such as firewall 10 and wireless access point 11, monitoring activity of compute instances, monitoring stored files/data on the compute instances 10-26 such as desktop computers, laptop computers, other mobile computing devices, and cloud computing instances 19, 109. Events may range in granularity. An exemplary event may be communication of a specific packet over the network. Another exemplary event may be identification of an application that is communicating over a network.

The event logging facility 166 may be used to store events collected by the event collection facility 164. The event logging facility 166 may store collected events so that they can be accessed and analyzed by the analytics facility 168. Some events may be collected locally, and some events may be communicated to an event store in a central location or cloud facility. Events may be logged in any suitable format.

Events collected by the event logging facility 166 may be used by the analytics facility 168 to make inferences and observations about the events. These observations and inferences may be used as part of policies enforced by the security management facility. Observations or inferences about events may also be logged by the event logging facility 166.

When a threat or other policy violation is detected by the security management facility 122, the remedial action facility 128 may be used to remediate the threat. Remedial action may take a variety of forms, non-limiting examples including collecting additional data about the threat, terminating or modifying an ongoing process or interaction, sending a warning to a user or administrator, downloading a data file with commands, definitions, instructions, or the like to remediate the threat, requesting additional information from the requesting device, such as the application that initiated the activity of interest, executing a program or application to remediate against a threat or violation, increasing telemetry or recording interactions for subsequent evaluation, (continuing to) block requests to a particular network location or locations, scanning a requesting application or device, quarantine of a requesting application or the device, isolation of the requesting application or the device, deployment of a sandbox, blocking access to resources, e.g., a USB port, or other remedial actions. More generally, the remedial action facility 122 may take any steps or deploy any measures suitable for addressing a detection of a threat, potential threat, policy violation or other event, code or activity that might compromise security of a computing instance 10-26 or the enterprise facility 102.

Figure 2:
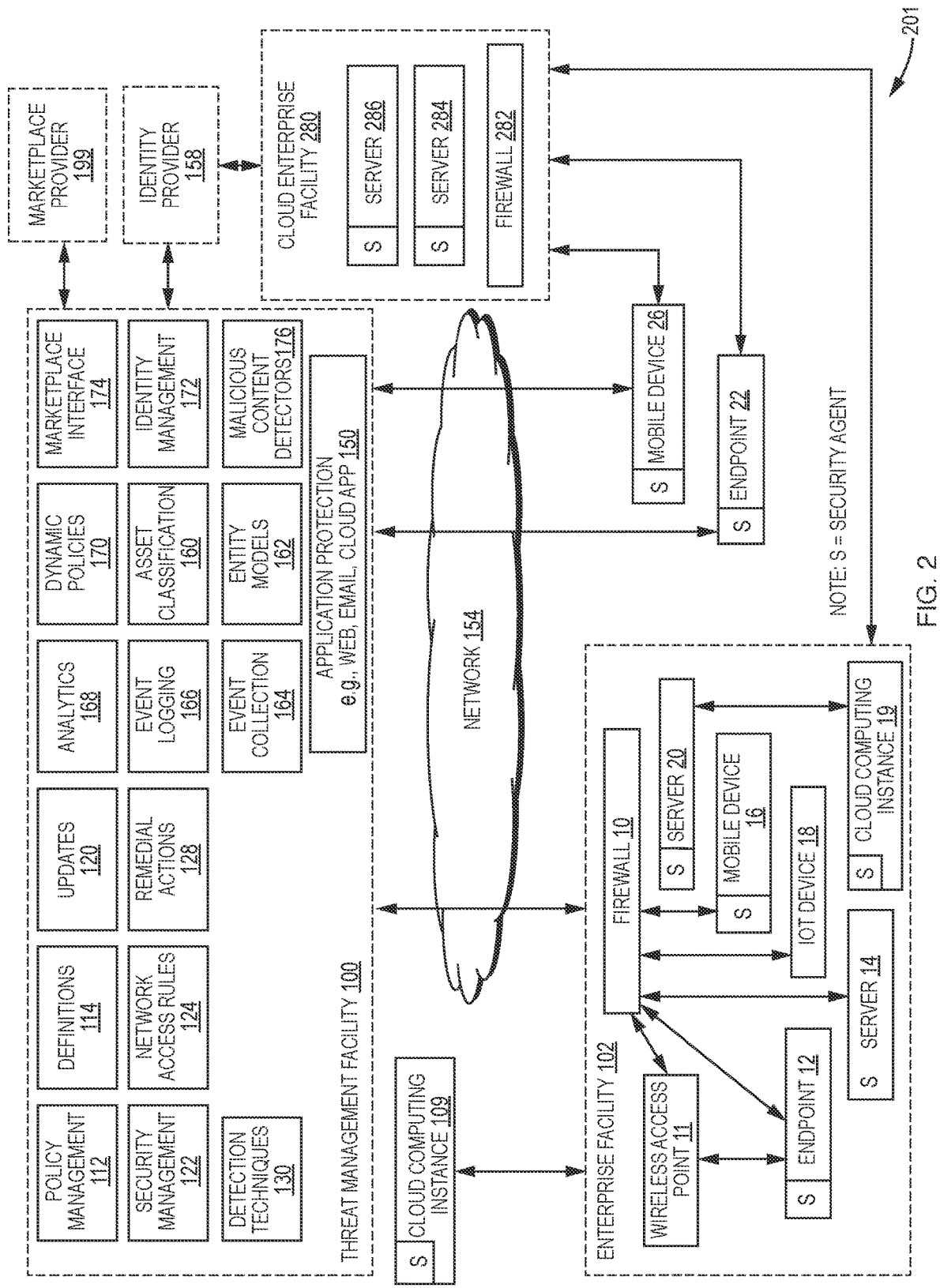
FIG. 2 depicts a block diagram of a threat management system, according to one example embodiment.

FIG. 2 depicts a block diagram of a threat management system 201 such as any of the threat management systems described herein and including a cloud enterprise facility 280. The cloud enterprise facility 280 may include servers 284, 286, and a firewall 282. The servers 284, 286 on the cloud enterprise facility 280 may run one or more enterprise applications and make them available to the enterprise facilities 102 compute instances 10-26. It should be understood that there may be any number of servers 284, 286 and firewalls 282, as well as other compute instances in a given cloud enterprise facility 280. It also should be understood that a given enterprise facility may use both SaaS applications 156 and cloud enterprise facilities 280, or, for example, a SaaS application 156 may be deployed on a cloud enterprise facility 280. As such, the configurations in FIG. 1 and FIG. 2 are shown by way of examples and not exclusive alternatives.

Figure 3:
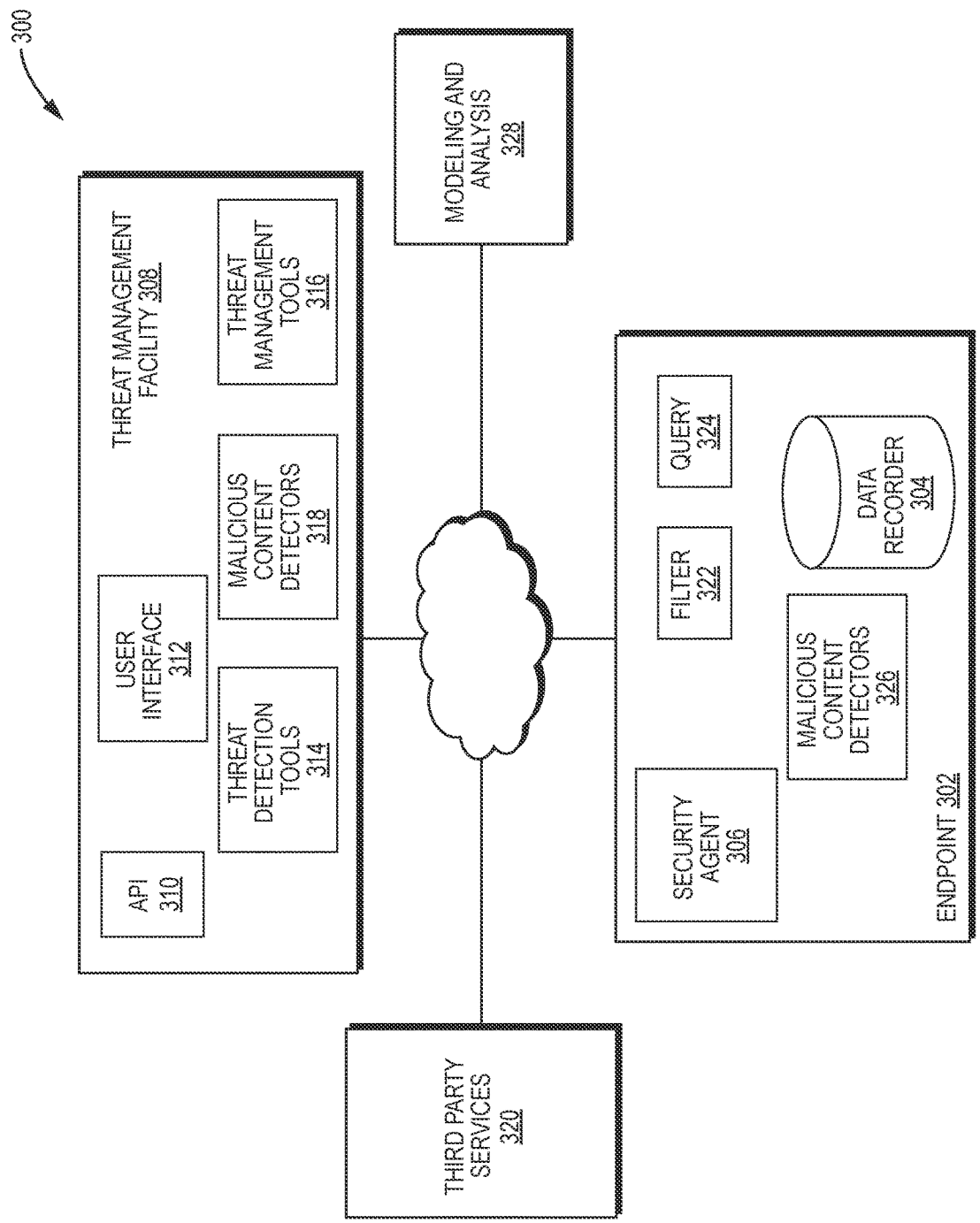
FIG. 3 shows a system for enterprise network threat detection, according to one example embodiment.

FIG. 3 shows a system 300 for enterprise network threat detection. The system 300 may use any of the various tools and techniques for threat management contemplated herein. In the system, a number of endpoints such as the endpoint 302 may log events in a data recorder 304. A local agent on the endpoint 302 such as the security agent 306 may filter this data and feeds a filtered data stream to a threat management facility 308 such as a central threat management facility or any of the other threat management facilities described herein. The threat management facility 308 can locally or globally tune filtering by local agents based on the current data stream and can query local event data recorders for additional information where necessary or helpful in threat detection or forensic analysis. The threat management facility 308 may also or instead store and deploys a number of security tools such as a web-based user interface that is supported by machine learning models to aid in the identification and assessment of potential threats by a human user. This may, for example, include machine learning analysis of new code samples, models to provide human-readable context for evaluating potential threats, and any of the other tools or techniques described herein. More generally, the threat management facility 308 may provide any of a variety of threat detection tools 314, threat management tools 316, and/or malicious content detectors 318 to aid in the detection, evaluation, and remediation of threats or potential threats.

The threat management facility 308 may perform a range of threat management functions such as any of those described herein. The threat management facility 308 may generally include an application programming interface 310 to third party services 320, a user interface 312 for access to threat management and network administration functions, and a number of threat detection tools 314, threat management tools 316, and malicious content detectors 318.

In general, the application programming interface 310 may support programmatic connections with third party services 320. The application programming interface 310 may, for example, connect to Active Directory or other customer information about files, data storage, identities and user profiles, roles, access privileges and so forth. More generally the application programming interface 310 may provide a programmatic interface for customer or other third party context, information, administration and security tools, and so forth. The application programming interface 310 may also or instead provide a programmatic interface for hosted applications, identity provider integration tools or services, and so forth.

The user interface 312 may include a website or other graphical interface or the like and may generally provide an interface for user interaction with the threat management facility 308, e.g., for threat detection, network administration, audit, configuration and so forth. This user interface 312 may generally facilitate human curation of intermediate threats as contemplated herein, e.g., by presenting intermediate threats along with other supplemental information, and providing controls for user to dispose of such intermediate threats as desired, e.g., by permitting execution or access, by denying execution or access, or by engaging in remedial measures such as sandboxing, quarantining, vaccinating, and so forth.

The threat detection tools 314 may be any of the threat detection tools, algorithms, techniques or the like described herein, or any other tools or the like useful for detecting threats or potential threats within an enterprise network. This may, for example, include signature based tools, behavioral tools, machine learning models, and so forth. In general, the threat detection tools 314 may use event data provided by endpoints within the enterprise network, as well as any other available context such as network activity, heartbeats, and so forth to detect malicious software or potentially unsafe conditions for a network or endpoints connected to the network. In one aspect, the threat detection tools 314 may usefully integrate event data from a number of endpoints (including, e.g., network components such as gateways, routers, and firewalls) for improved threat detection in the context of complex or distributed threats. The threat detection tools 314 may also or instead include tools for reporting to a separate modeling and analysis platform 328, e.g., to support further investigation of security issues, creation or refinement of threat detection models or algorithms, review and analysis of security breaches, and so forth.

The threat management tools 316 may generally be used to manage or remediate threats to the enterprise network that have been identified with the threat detection tools 314 or otherwise. Threat management tools 316 may, for example, include tools for sandboxing, quarantining, removing, or otherwise remediating or managing malicious code or malicious activity, e.g., using any of the techniques described herein.

The malicious content detectors 318 may generally be used to recognize new or previously unknown malicious content by using a variety of machine learning algorithms and techniques, including but not limited to a rapidly deployed machine learning model in the form of a generative natural language model and selected samples of malicious and/or non-malicious content. As shown in FIG. 3, each of the one or more malicious content detectors 318 is a standalone software application located in threat management facility 308 that communicates with, e.g., threat detection tools 314 and/or threat management tools 316 for the purpose of detecting malicious content. It should be appreciated that, in some embodiments, the malicious content detector 318 is integrated into the functionality of the threat detection tools 314 and/or the threat management tools 316. As will be described below, in some embodiments one or more of the malicious content detectors 318 are part of a security recognition device integrated into the threat management facility 308. Additional detail about the functionality and operation of the malicious content detectors 318 will be provided later in the specification.

The endpoint 302 may be any of the endpoints or other compute instances or the like described herein. This may, for example, include end-user computing devices, mobile devices, firewalls, gateways, servers, routers and any other computing devices or instances that might connect to an enterprise network. As described above, the endpoint 302 may generally include a security agent 306 that locally supports threat management on the endpoint 302, such as by monitoring for malicious activity, managing security components on the endpoint 302, maintaining policy compliance, and communicating with the threat management facility 308 to support integrated security protection as contemplated herein. The security agent 306 may, for example, coordinate instrumentation of the endpoint 302 to detect various event types involving various computing objects on the endpoint 302 and supervise logging of events in a data recorder 304. The security agent 306 may also or instead scan computing objects such as electronic communications or files, monitor behavior of computing objects such as executables, and so forth. The security agent 306 may, for example, apply signature-based or behavioral threat detection techniques, machine learning models (e.g., models developed by the modeling and analysis platform), or any other tools or the like suitable for detecting malware or potential malware on the endpoint 302.

The data recorder 304 may log events occurring on or related to the endpoint. This may, for example, include events associated with computing objects on the endpoint 302 such as file manipulations, software installations, and so forth. This may also or instead include activities directed from the endpoint 302, such as requests for content from Uniform Resource Locators or other network activity involving remote resources. The data recorder 304 may record data at any frequency and any level of granularity consistent with proper operation of the endpoint 302 in an intended or desired manner.

The endpoint 302 may include a filter 322 to manage a flow of information from the data recorder 304 to a remote resource such as the threat detection tools 314 of the threat management facility 308. In this manner, a detailed log of events may be maintained locally on each endpoint, while network resources can be conserved for reporting of a filtered event stream that contains information believed to be most relevant to threat detection. The filter 322 may also or instead be configured to report causal information that causally relates collections of events to one another. In general, the filter 322 may be configurable so that, for example, the threat management facility 308 can increase or decrease the level of reporting based on a current security status of the endpoint, a group of endpoints, the enterprise network, and the like. The level of reporting may also or instead be based on currently available network and computing resources, or any other appropriate context.

In another aspect, the endpoint 302 may include a query interface 324 so that remote resources such as the threat management facility 308 can query the data recorder 304 remotely for additional information. This may include a request for specific events, activity for specific computing objects, or events over a specific time frame, or some combination of these. Thus, for example, the threat management facility 308 may request all changes to the registry of system information for the past forty-eight hours, all files opened by system processes in the past day, all network connections or network communications within the past hour, or any other parametrized request for activities monitored by the data recorder 304. In another aspect, the entire data log, or the entire log over some predetermined window of time, may be requested for further analysis at a remote resource.

In some embodiments, the endpoint 302 includes one or more malicious content detectors 326 to recognize new or previously unknown malicious content. The functionality and operation of the malicious content detectors 326 can be the same as or different from the functionality and operation of the malicious content detectors 318 of threat management facility 308. In some embodiments, one or more of the malicious content detectors 326 and one or more of the malicious content detectors 318 work together to recognize new or unknown malicious content using the techniques and algorithms described herein. As will be described below, in some embodiments the malicious content detectors 326 are part of a security recognition device integrated into the endpoint 302.

It will be appreciated that communications among third party services 320, a threat management facility 308, and one or more endpoints such as the endpoint 302 may be facilitated by using consistent naming conventions across products and machines. For example, the system 300 may usefully implement globally unique device identifiers, user identifiers, application identifiers, data identifiers, Uniform Resource Locators, network flows, and files. The system may also or instead use tuples to uniquely identify communications or network connections based on, e.g., source and destination addresses and so forth.

According to the foregoing, a system disclosed herein includes an enterprise network, and endpoint coupled to the enterprise network, and a threat management facility coupled in a communicating relationship with the endpoint and a plurality of other endpoints through the enterprise network. The endpoint may have a data recorder that stores an event stream of event data for computing objects, a filter for creating a filtered event stream with a subset of event data from the event stream, and a query interface for receiving queries to the data recorder from a remote resource, the endpoint further including a local security agent configured to detect malware on the endpoint based on event data stored by the data recorder, and further configured to communicate the filtered event stream over the enterprise network. The threat management facility may be configured to receive the filtered event stream from the endpoint, detect malware on the endpoint based on the filtered event stream, and remediate the endpoint when malware is detected, the threat management facility further configured to modify security functions within the enterprise network based on a security state of the endpoint.

The threat management facility may be configured to adjust reporting of event data through the filter in response to a change in the filtered event stream received from the endpoint. The threat management facility may be configured to adjust reporting of event data through the filter when the filtered event stream indicates a compromised security state of the endpoint. The threat management facility may be configured to adjust reporting of event data from one or more other endpoints in response to a change in the filtered event stream received from the endpoint. The threat management facility may be configured to adjust reporting of event data through the filter when the filtered event stream indicates a compromised security state of the endpoint. The threat management facility may be configured to request additional data from the data recorder when the filtered event stream indicates a compromised security state of the endpoint. The threat management facility may be configured to request additional data from the data recorder when a security agent of the endpoint reports a security compromise independently from the filtered event stream. The threat management facility may be configured to adjust handling of network traffic at a gateway to the enterprise network in response to a predetermined change in the filtered event stream. The threat management facility may include a machine learning model for identifying potentially malicious activity on the endpoint based on the filtered event stream. The threat management facility may be configured to detect potentially malicious activity based on a plurality of filtered event streams from a plurality of endpoints. The threat management facility may be configured to detect malware on the endpoint based on the filtered event stream and additional context for the endpoint.

The data recorder may record one or more events from a kernel driver. The data recorder may record at least one change to a registry of system settings for the endpoint. The endpoints may include a server, a firewall for the enterprise network, a gateway for the enterprise network, or any combination of these. The endpoint may be coupled to the enterprise network through a virtual private network or a wireless network. The endpoint may be configured to periodically transmit a snapshot of aggregated, unfiltered data from the data recorder to the threat management facility for remote storage. The data recorder may be configured to delete records in the data recorder corresponding to the snapshot in order to free memory on the endpoint for additional recording.

Figure 4:
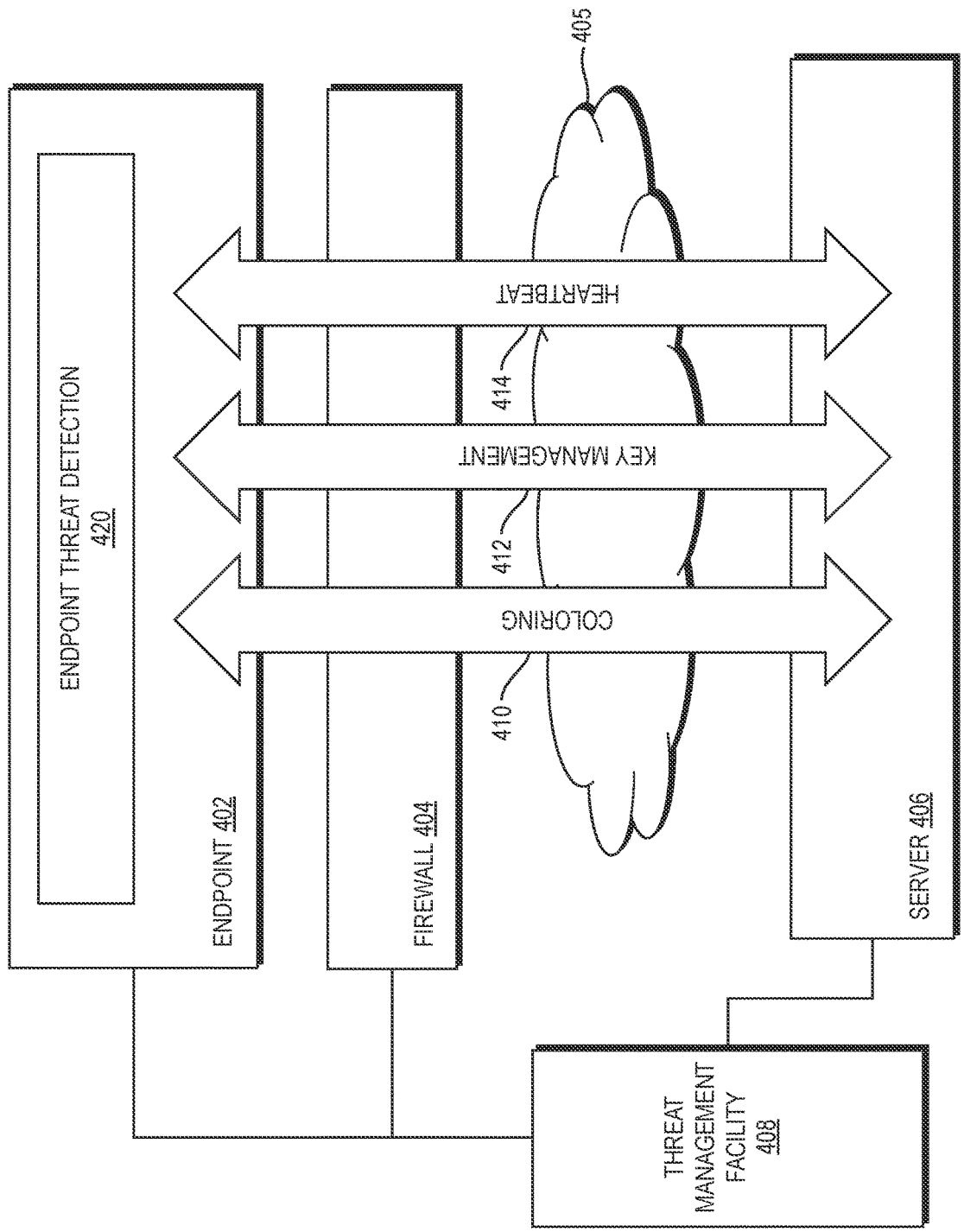
FIG. 4 illustrates a threat management system, according to one example embodiment.

FIG. 4 illustrates a threat management system. In general, the system may include an endpoint 402, a firewall 404, a server 406 and a threat management facility 408 coupled to one another directly or indirectly through a data network 405, all as generally described above. Each of the entities depicted in FIG. 4 may, for example, be implemented on one or more computing devices such as the computing device described herein. A number of systems may be distributed across these various components to support threat detection, such as a coloring system 410, a key management system 412 and a heartbeat system 414, each of which may include software components executing on any of the foregoing system components, and each of which may communicate with the threat management facility 408 and an endpoint threat detection agent 420 executing on the endpoint 402 to support improved threat detection and remediation.

The coloring system 410 may be used to label or color software objects for improved tracking and detection of potentially harmful activity. The coloring system 410 may, for example, label files, executables, processes, network communications, data sources and so forth with any suitable information. A variety of techniques may be used to select static and/or dynamic labels for any of these various software objects, and to manage the mechanics of applying and propagating coloring information as appropriate. For example, a process may inherit a color from an application that launches the process. Similarly, a file may inherit a color from a process when it is created or opened by a process, and/or a process may inherit a color from a file that the process has opened. More generally, any type of labeling, as well as rules for propagating, inheriting, changing, or otherwise manipulating such labels, may be used by the coloring system 410 as contemplated herein.

The key management system 412 may support management of keys for the endpoint 402 in order to selectively permit or prevent access to content on the endpoint 402 on a file-specific basis, a process-specific basis, an application-specific basis, a user-specific basis, or any other suitable basis in order to prevent data leakage, and in order to support more fine-grained and immediate control over access to content on the endpoint 402 when a security compromise is detected. Thus, for example, if a particular process executing on the endpoint is compromised, or potentially compromised or otherwise under suspicion, keys to that process may be revoked in order to prevent, e.g., data leakage or other malicious activity.

The heartbeat system 414 may be used to provide periodic or aperiodic information from the endpoint 402 or other system components about system health, security, status, and so forth. A heartbeat may be encrypted or plaintext, or some combination of these, and may be communicated unidirectionally (e.g., from the endpoint 408 to the threat management facility 408) or bidirectionally (e.g., between the endpoint 402 and the server 406, or any other pair of system components) on any useful schedule.

In general, these various monitoring and management systems may cooperate to provide improved threat detection and response. For example, the coloring system 410 may be used to evaluate when a particular process is potentially opening inappropriate files based on an inconsistency or mismatch in colors, and a potential threat may be confirmed based on an interrupted heartbeat from the heartbeat system 414. The key management system 412 may then be deployed to revoke keys to the process so that no further files can be opened, deleted, or otherwise modified. More generally, the cooperation of these systems enables a wide variety of reactive measures that can improve detection and remediation of potential threats to an endpoint.

As mentioned above, one aspect of the invention described herein is a malicious content detector that recognizes new or unknown malicious content or families of malicious content using one or more rapidly developed and deployed machine learning models. In some implementations, the machine learning model used by the malicious content detector is a generative natural language model trained for detection of malicious content. Detection of malicious content may include but is not limited to the recognition of maliciousness, a security threat, suspiciousness, spam (e.g., unwanted email or text messages), phishing, or any other relevant analysis result. For example, a security recognition may include detection of malware. The object of detection tasks may be any suitable artifact, for example, files (e.g., script files, text files, HTML files, XML files, portable executable (PE) files), documents, memory extracts, messages (e.g., text messages, email messages, social network or collaborative messaging posts), web sites (e.g., universal resource locator (URL) addresses), or any other suitable analysis object. Detection tasks may be applied, for example, to features determined by static analysis, dynamic analysis, behavior analysis, activity analysis, or any other suitable features.

In addition to features of an object of analysis, context information also may be included in the analysis. In various implementations, contextual information may include message information, such as message header information, source of a file, message, or network stream, destination of a file, message, or network stream, reputations associated with a sender, receiver or file, profile information associated with a sender or receiver, time zone information, timestamp information, transmission path information, attachment file size, attachment information, domain reputation information, URLs, fonts or other message content context information, or any other suitable contextual information. The contextual information may be used in combination with content information to improve the performance of the detector.

In a first exemplary implementation, target content are text messages, and the samples are labeled or unlabeled text messages that are, e.g., part of a phishing campaign. In a second exemplary implementation, target content are natural language descriptions of the functionality of command line strings and the samples are command line strings that execute to perform activity on a computing device. In a third exemplary implementation, target content are command line strings that execute to perform activity on a computing device and the samples are natural language descriptions of the functionality of command line strings.

Figure 5:
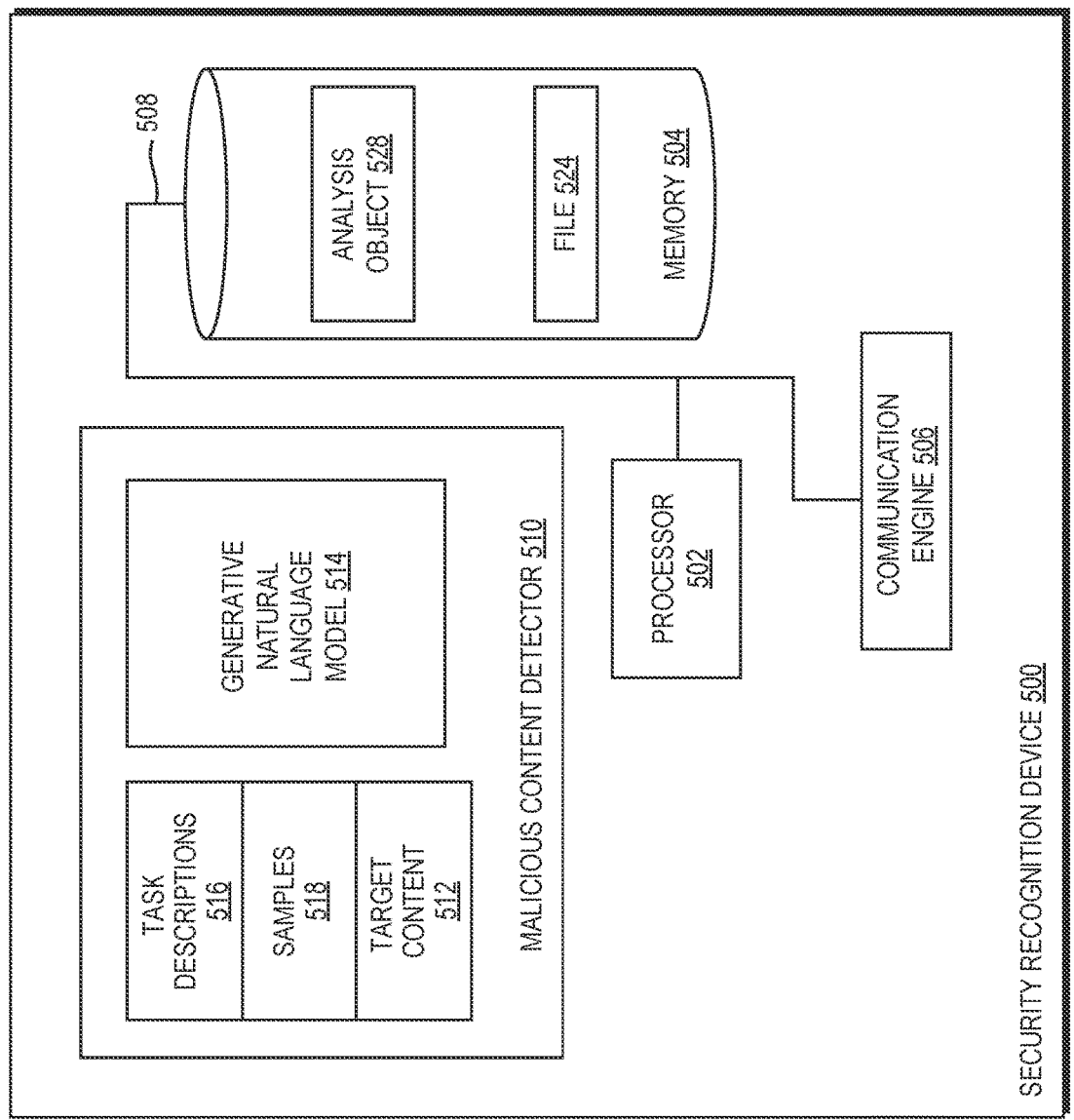
FIG. 5 illustrates a block diagram of a security recognition device according to embodiments.

FIG. 5 illustrates a block diagram of a security recognition device 500, according to an embodiment. The security recognition device 500 may be a hardware-based computing device and/or a multimedia device, such as, for example, a compute device, a server, a desktop personal computer, a smartphone, a tablet, a laptop or the like. These are non-limiting examples, and the security recognition device 500 may be any type of compute instance. For example, the security recognition device 500 may be incorporated into or otherwise coupled to, e.g., end point 302 or threat management facility 308 of FIG. 3. As shown, the security recognition device 500 includes a processor 502, a memory 504 and a communication engine 506.

The processor 502 may be, for example, a hardware based integrated circuit (IC), or any other suitable processing device configured to run and/or execute a set of instructions or code. For example, the processor 502 may be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. The processor 502 is operatively coupled to the memory 504 through a system bus 508 (for example, address bus, data bus and/or control bus).

The processor 502 may be configured to execute a security application that includes a malicious content detector 510. The security application may be any suitable security application, such as an email security program, a log collection application (e.g., SIEM), or a network security application, as non-limiting examples. The security application has a malicious content detector 510 that allows for the detection of malicious messages. The malicious content detector 510 may be part of the security application or may make the security application's data available to the malicious content detector 510. A malicious content detector 510 typically provides a classification of analysis objects for malicious content, for purposes of identifications and alerts. In some embodiments, the malicious content detector 510 applies one or more machine learning techniques or algorithms for classifying objects or content as malicious or non-malicious through use of a prediction of a classification label to be assigned to the objects or content.

The malicious content detector 510 evaluates target content, for example, text content. The malicious content detector may be implemented with a generative natural language model 514 and samples 518. In some implementations, a relatively small number of samples 518 are used. The samples 518 and the target content 512 to be evaluated are presented to the generative natural language model 514 as a prediction problem, where the prediction problem is to predict the classification of the target content 512 based on the samples 518.

In some implementations, the malicious content detector is further implemented with one or more task descriptions 516. The task descriptions 516 are presented to the generative natural language model 514 along with the target content 512 and samples 518, to guide the generative natural language model 514 in performing one or more analysis, prediction and/or classification tasks. In some embodiments, the task descriptions 516 comprise natural language instructions, or programmatic instructions, defining a type of output that the generative natural language model 514 should return based upon the input samples and/or target content, or defining particular processing steps the model should perform when analyzing and classifying the target content 512 and the samples 518. It should be appreciated that use of task descriptions 516 is optional.

In some implementations, an input document is generated that includes the samples 518 and the target content 512. The samples of text content are preceded by an indicator of the content (e.g., "Message:") and the evaluation (e.g., "Label:"). The target content is preceded by an indicator that it is content (e.g., "Message:") the evaluation indicator (e.g., "Label:") is provided without a label. The natural language model then attempts to autocomplete (i.e., determine a label for the corresponding content) based on the input.

In some implementations, a malicious content detector 510 may be specified by an identifier of a natural language model 514, configuration parameters for the natural language model, content samples that include indicators of content (e.g., "Message:" and "Label:"), and a script file that interprets the output from the natural language model. For example, the script file may interpret the output of an autocomplete task to parse out the detection.

The target content 512 may be any type of content, such as some or all of an analysis object 528 (e.g., one or more of a file, a text stream, a message, etc.). For example, in an exemplary implementation in which an analysis object 528 is a message, the target content 512 may be words or characteristics of text in a file (e.g, message text, message subject, message headers, strings, sub-strings, elements, tags). In some implementations, a portion or all of a message or text may be translated or transformed before providing it to the natural language model.

The natural language model 514 may be any suitable type of machine learning model, and preferably is a generative natural language model, such as GPT-3 available from OpenAI or Open Pretrained Transformer (OPT-175B), available from Meta. The natural language model 514 may be provided as an API to the model that is hosted in a different location than the malicious content detector 510, for example, in a cloud hosted environment. The natural language model is provided with a prediction problem, such as an autocomplete problem, and the output may provide a result indicating a threat classification. The threat classification may indicate an evaluation of maliciousness and/or an evaluation of the likelihood that the analysis object is a threat. In some implementations, a threat classification may provide an output within a range (for example, between 0 and 10, between 0 and 1, between 0 and 4) that relates to a probability of maliciousness. In some implementations, a threat classification may classify an analysis object into different categories such as, for example, benign, potentially malicious, malicious, type of malicious content/activity, class of malicious content/activity, attack family, or another suitable threat classification. For example, in an implementation where natural language model 514 is tasked with determining the maliciousness of an analysis object that comprises text messages, the threat classification may indicate an evaluation of whether one or more of the text messages in the analysis object are spam or phishing.

The memory 504 of the security recognition device 500 may be, for example, a random-access memory (RAM), a memory buffer, a hard drive, a solid-state drive, a read-only memory (ROM), an erasable programmable read-only memory (EPROM), and/or the like or a combination. The memory 504 can store, for example, one or more software modules and/or code that can include instructions to cause the processor 502 to perform one or more processes, functions, and/or the like. In some implementations, the memory 504 may be a portable memory (for example, a flash drive, a portable hard disk, and/or the like) that may be operatively coupled to the processor 502. In other instances, the memory may be remotely operatively coupled with the security recognition device 500. For example, a remote database server may be operatively coupled to the security recognition device 500.

The memory 504 may store the samples 518 and/or task descriptions 516, for example, in a file 524. As mentioned above, the samples 518 and task descriptions 516 may include data used by the natural language model 514 to process and/or analyze an analysis object (for examples, labeled data including messages and labels). The file 524 may include a specification for a detector, that may include an indication of a natural language model, configuration parameters for the natural language model, samples, and information useful for interpreting the results, such as a script that may be used to interpret the results.

The memory may also include an analysis object 528. The analysis object 528 may be, may derived from, or may be based on an identified object. The analysis object 528 may be, may be derived from, or may be based on multiple or a combination of identified objects. For example, the analysis object 528 may be, may include, or may be based on any one or more of an email message, a representation of a text stream, a document, a command line, a command line file, a command line script, a text message, a social media post, a web site post and/or another suitable analysis object. For example, in various implementations, the file may be at least one of a Hypertext Markup Language (HTML) file(s), a JavaScript file(s), an Extensible Markup Language (XML) file, a Hypertext Preprocessor (PHP) file(s), Microsoft® office documents (for example, Word®, Excel®, PowerPoint®, and/or the like), a uniform resource locator (URL), Android Package Kit (APK) files, Portable Document Format (PDF) files, any other files having defined structure, and/or any other type of analysis object. For example, the analysis object 528 may include, may be based on, or may reference any one or more of software code, a webpage(s), a data file(s), a model file(s), a source file(s), a script(s), a process(es), a binary executable file(s), data and/or a table(s) in a database system, a development deliverable(s), an active content(s), a word-processing document(s), an e-mail message(s), a text message(s), data associated with a device or an entity (e.g., a network-connected compute device and/or computer system, a server, a smartphone, a tablet a laptop, a multimedia device, etc.), and/or the like. In some instances, the analysis object 528 may be analyzed by the malicious content detector 510 using the samples 518 (and in some embodiments, the task descriptions 516) to determine whether the analysis object 528 should be treated as malicious or not malicious, as described in further detail herein.

In some implementations, an analysis object 528 may be, for example, a representation of a network stream or a text stream. An analysis object may include or be based on the output of one or more network sensors recording network traffic. For example, packet data may be extracted from network traffic. For example, the analysis object may include data extracted from a log. The analysis object may include data extracted from a data lake of sensor data.

The communication engine 506 may be a hardware device operatively coupled to the processor 502 and memory 504 and/or software stored in the memory 504 executed by the processor 502. The communication engine 506 may be, for example, a network interface card (NIC), a Wi-Fi™ module, a Bluetooth® module, an long-term evolution (LTE) module, and/or any other suitable wired and/or wireless communication device. Furthermore, the communication engine can include a switch, a router, a hub and/or any other network device. The communication engine 506 may be configured to connect the security recognition device 500 to a communication network (not shown). In some instances, the communication engine 506 may be configured to connect to a communication network such as, for example, the Internet, an intranet, a local area network (LAN), a wide area network (WAN), a metropolitan area network (MAN), a worldwide interoperability for microwave access network (WiMAX®), an optical fiber (or fiber optic)-based network, a Bluetooth® network, a GSM/EDGE network, an LTE network, a virtual network, and/or any combination thereof.

In some instances, the communication engine 506 can facilitate receiving and/or transmitting samples 518, task descriptions 516, and/or one or more analysis objects 528 through a communication network. In some instances, received data may be processed by the processor 502 and/or stored in the memory 504. In some instances, the natural language model 514 may be accessed through a communication network, and samples 518, task descriptions 516, and target content 512 are provided to the natural language model 114 over the network.

In use, the security recognition device 500 may be configured to receive an analysis object 500, from a communication network (not shown in FIG. 5) via the communication engine 506 and/or via any other suitable method (e.g., via a removable memory device). The security recognition device may be configured to receive samples 518 and/or task descriptions 516 from a communication network (not shown in FIG. 5). The determination of the malicious content detector 510 may be stored or cause other activity to be undertaken, for example, to respond to, block, or remediate the malicious activity.

Figure 6:
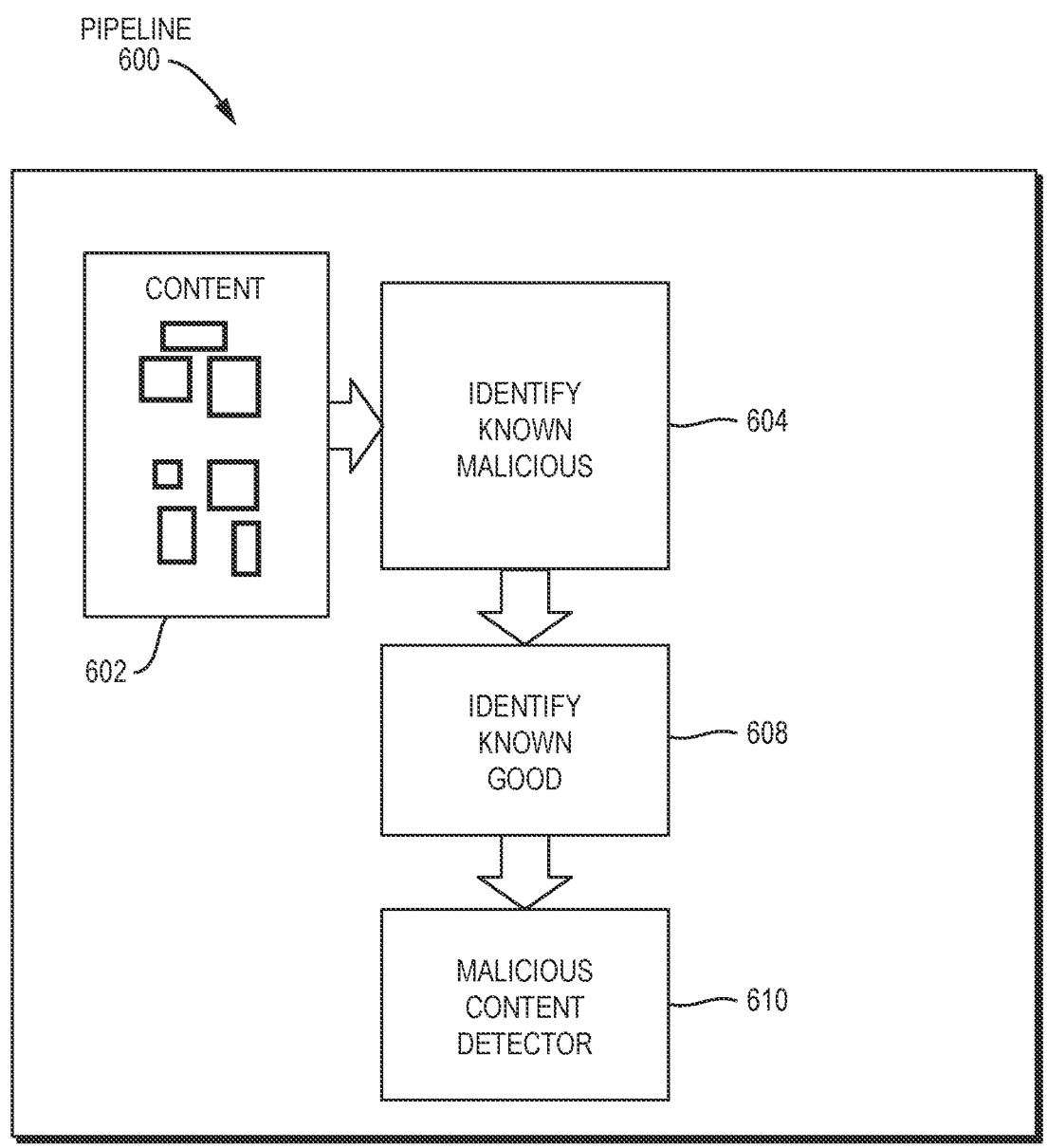
FIG. 6 illustrates a malicious content defense pipeline according to embodiments.

Referring to FIG. 6, an exemplary malicious content defense pipeline 600 includes content 602, which is evaluated by the pipeline 600. The pipeline 600 may first identify known malicious content 604, for example based on signatures, metadata, reputations, or any other techniques. The pipeline 600 may identify malicious content 604 using a "reject list" or blacklist. Identification of malicious content can also be referred to as conviction of the content. The pipeline 600 may identify known good content, again based on signatures, metadata, reputations, or other techniques. For example, metadata associated with the content may be on an "accept list" or whitelist. Identification of malicious content can also be referred to as acceptance of the content. Content that has not been convicted as malicious and has not been accepted may be submitted for further evaluation, for example, using the malicious content detector 610.

In general, in some implementations the malicious content detector 610 may be less efficient than other types of detectors, and so would be better suited to be used after other techniques have narrowed down the content to be evaluated.

Figure 7:
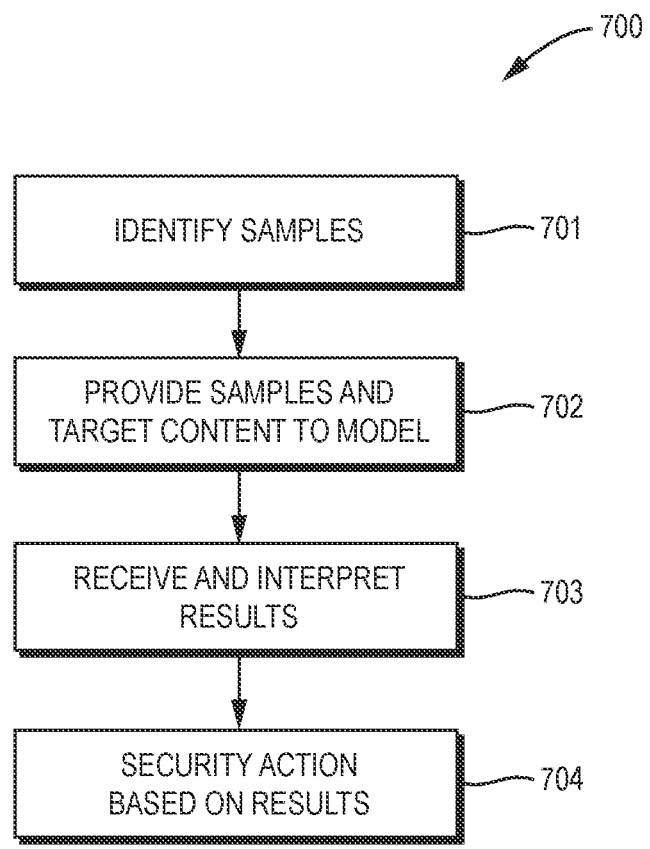
FIG. 7 illustrates a flow diagram of a method of rapid development of a malicious content detector according to embodiments.

FIG. 7 is a flow diagram of a computerized method 700 of rapid development of a malicious content detector. At block 701, the method may include identifying one or more samples. This may include selecting samples labeled as malicious and samples labeled as benign. In some implementations, the label may be a number. In some implementations, the label may be a letter or a word. In some implementations, the samples may include text strings that provide identification of the sample and the corresponding label. In some implementations, the number of identified samples may be less than 1000, less than 500, less than 100, less than 50, less than 20, less than 10, or less than 5. For example, the generative natural language model can be configured to receive and process only a few identified samples (also called few-shot learning), only one identified sample (also called one-shot learning), or no samples (also called zero-shot learning). In the case where no samples are identified, the model can receive a task description to guide the model in generating a prediction for the target content.

In some implementations, a detector may be specified by samples, model configuration parameters, and a results definition, which may be a script to interpret the results. In some implementations, model configuration parameters can include, but are not limited to, data elements to define the characteristics of the structure and operation of the generative natural language model (e.g., execution engine, response length, temperature, top P, frequency, stop sequence, etc.).

At block 702, the method may include providing the samples, task descriptions (if utilized), and target content to the model. In some implementations, the samples, task descriptions, and target content may be integrated into a file, document or text stream that is provided to the model. In some implementations, the samples, task descriptions, and target content may be uploaded to a model as one input. In some implementations, the samples and target content are labeled. In some implementations the samples, task descriptions, and target content are provided to the model as a prediction problem, for example, an autocomplete problem, where the model is directed to autocomplete the text that is provided as input.

At block 703, the output from the model may be provided and interpreted. For example, if the model was presented with a prediction problem, the output of the model will be the result of the prediction, which may be the labeled prediction.

At block 704, a security action may be taken based on the results. For example, if the model indicates that the content is malicious, the content may be blocked, flagged, filtered, or quarantined.

In some implementations, a number of different models may be used. The same input may be provided to more than one model, for example, models with different architectures or different parameters. A model may be selected from the number of models, for example, based on performance characteristics.

Generally and without limitation, the malicious content detection techniques described herein can be beneficially applied in any of a number of different use cases. Described below are two exemplary use cases: spam detection in text messages, and conversion of a command line string into natural language text to determine whether the command line is associated with malicious activity. It should be appreciated that other use cases and applications can be contemplated within the scope of the technology described herein.

Spam Detection

One beneficial application of the malicious content detection technology described herein is spam detection for message content. As can be appreciated, the volume of malicious spam messages (e.g., emails, text messages, and the like) being sent to end users has exponentially increased as computing devices such as smartphones and tablets have become commonplace. Malicious actors constantly change the content of such messages to avoid detection by existing message filters, which are typically unable to adapt their detection routines fast enough. Therefore, the ability to rapidly and dynamically detect such spam messages, and to invoke appropriate security actions is essential to an improved malicious content detection system.

Figure 8:
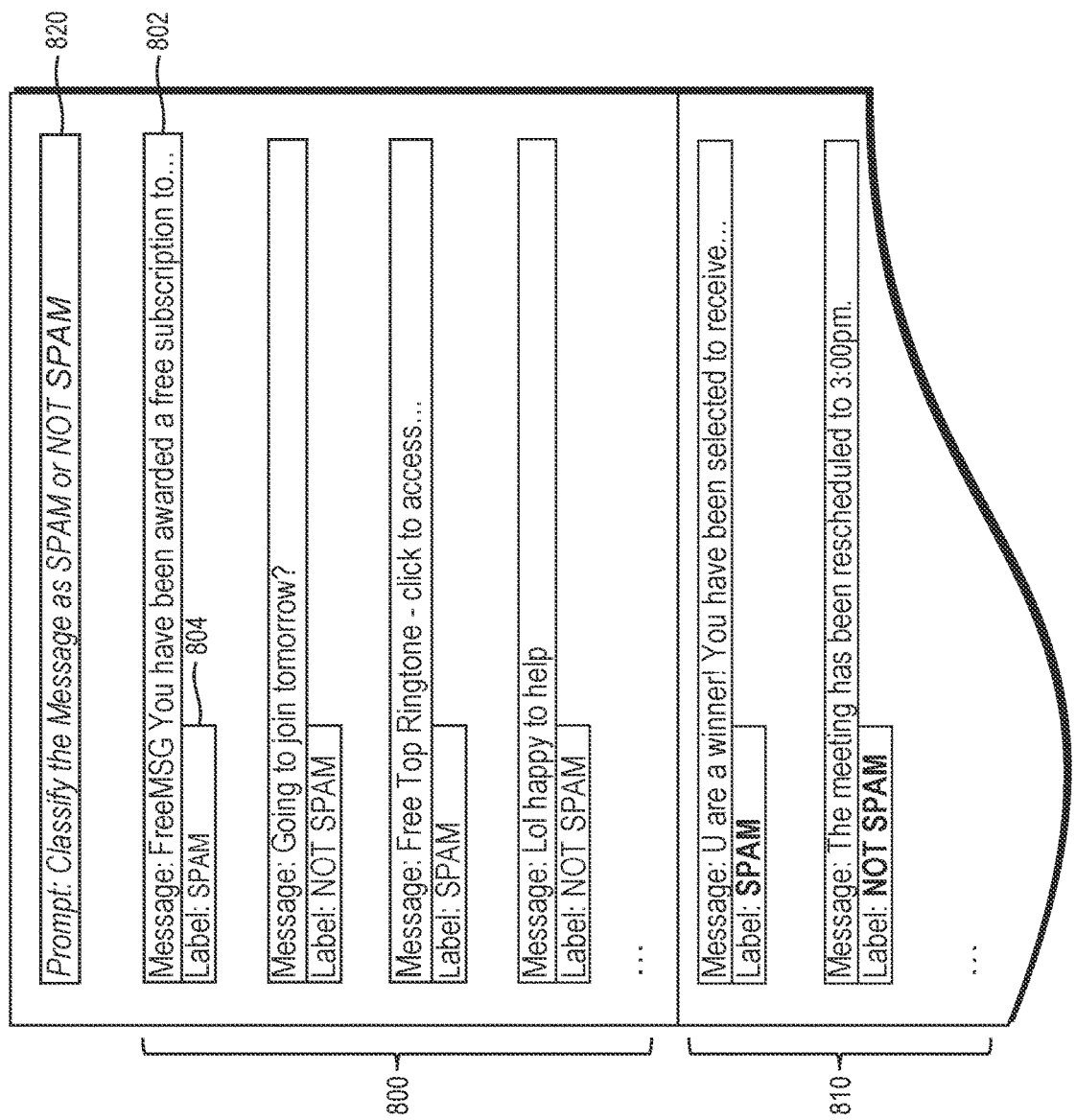
FIG. 8 illustrates an exemplary dataset for classifying text messages as spam or not spam using the malicious content detector, according to one example embodiment.

FIG. 8 is a diagram of an exemplary dataset for classifying text messages as spam (i.e., malicious) or not spam (i.e., benign) using the generative natural language model of the malicious content detector as described above. The dataset includes one or more sample text messages 800 (e.g., message 802) and associated labels (e.g., label 804) that indicates the determined classification of the text message. The prediction problem presented to the generative natural language model (e.g., 514 of FIG. 5) is to generate a classification of a new message (generally an incoming message that has not been previously analyzed and classified by the model), with the goal of detecting spam. In the dataset, sample messages 800 are provided to the model with the "Message:" indicator at the beginning of the line. Labels are provided with the indicator "Label" at the beginning of the line. The target content 810 is provided after the samples with the indicator "Message:" and the model is required to complete the line that begins with "Label:" The resulting output is assigned as the label for the corresponding message and provides an indication of whether the model classified the message as "spam." In this example the prediction problem is essentially an autocomplete task: given an input message, predict the next "word" (in this case, the label) based upon the positioning, relevance, and context of the words that came before.

In some embodiments, input to the model can also include a task description 820 that guides the model in performing the analysis and classification of the samples and target output. As shown in FIG. 8, the task description 820 in this example comprises the natural language text string: "Classify the Message as SPAM or NOT SPAM." The generative natural language model interprets the task description in the context of the provided samples and target content in order to carry out the classification task. It should be appreciated that use of a task description is optional and that, in some embodiments, the samples dataset 800 is sufficient to inform the model as to the prediction problem to be solved.

The generative natural language model analyzes the samples 800 (and task description 820, if provided) and predicts classification labels for the corresponding target content 810. As shown in FIG. 8, the model has predicted a label for each of the messages in the target content 810 that indicates whether the corresponding message should be considered spam or not spam. The generative natural language model returns the labeled target content to, e.g., the processor 502 of the security recognition device 500.

Upon receiving the labeled target content, the processor 502 of the security recognition device 500 can initiate one or more security actions based upon the labels applied to the target content. As described above, the security actions can comprise any of a number of different activities to respond to one or more security risks associated with the content that has been classified as spam by the model, and/or to dispose of the messages as desired, e.g., by permitting transmission of or access to the messages, by preventing transmission of or access to the messages, by applying a warning indicator to the messages, or by engaging in remedial measures such as sandboxing, quarantining, vaccinating, and so forth.

Generating Human-Readable Explanations of Suspicious Command Lines

Another beneficial application of the malicious content detection technology described herein is the ability to leverage generative natural language models to generate human-readable explanations of command line strings that may be associated with malicious activity. Typically, cybersecurity personnel such as Security Operations Center (SOC) analysts are tasked with manually analyzing thousands of suspicious command lines to determine whether execution of the commands would result in malicious actions against the enterprise computing environment. As can be appreciated, this activity is very time-consuming and prone to misinterpretation and other errors.

Figure 9A:
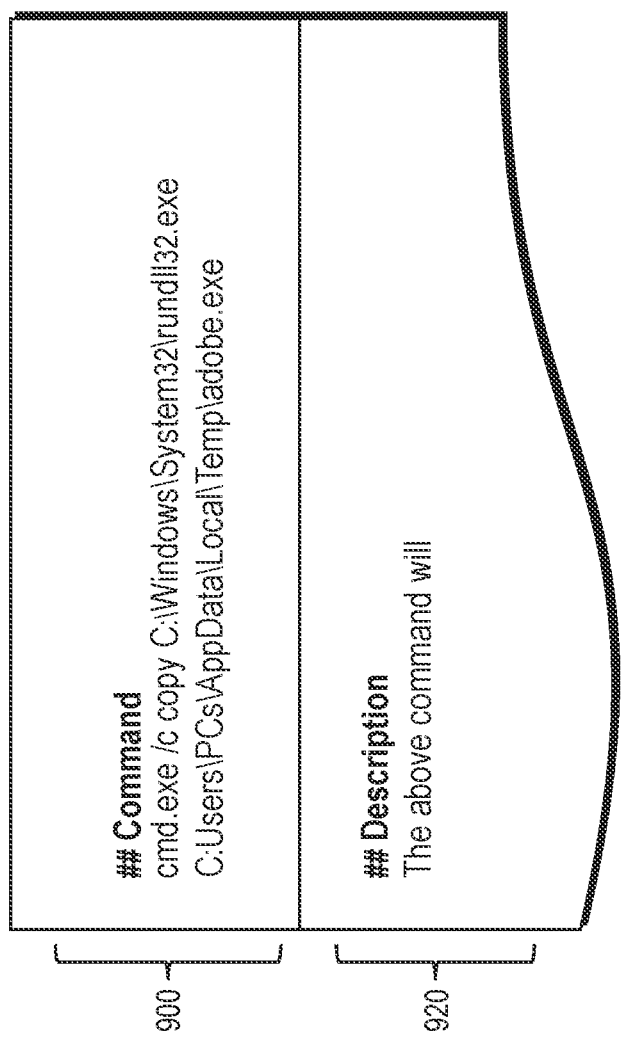
FIGS. 9A & 9B illustrate an input dataset, in accordance with an example embodiment, for generating human-readable explanations of command lines using the malicious content detector.

FIG. 9A is a diagram of an exemplary input dataset for generating human-readable explanations of command lines using the generative natural language model of the malicious content detector as described above. As shown in FIG. 9A, the input dataset comprises a command line 900 to be analyzed by the model and target content 910 in the form of an autocomplete prompt that the model will use to generate the human-readable description for the input command line 900. In this example, the target content comprises a text string "The above command will" that informs the model to provide an explanation of the activity undertaken when the command line is executed. The input dataset is provided to the generative natural language model.

Figure 9B:
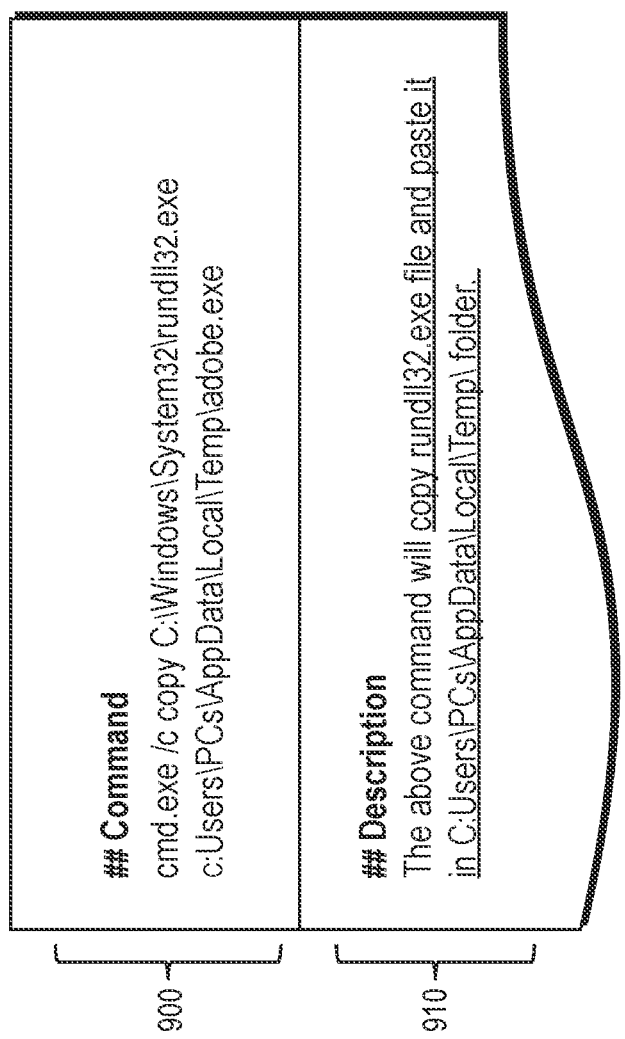

The generative natural language model analyzes the command line 900 and performs an autocomplete task to predict the next words for the target content prompt 910. As shown in FIG. 9B, the model has used the prompt to generate a human-readable description 920 of what the command line 900 is expected to do upon execution. The generative natural language model returns the human-readable description 920 to, e.g., the processor 502 of the security recognition device 500. Upon receiving the human-readable description, the processor 502 of the security recognition device 500 can provide the description to, e.g., a computing device of a SOC analyst for analysis and remediation if necessary.

In some implementations, suspicious command lines can be detected by signature-based rules and the signature names can provide useful context information for input to the generative natural language model when generating the human-readable description. For example, prior to generating the input dataset, the suspicious command line can be processed using one or more rulesets or pattern matching algorithms, such as SIGMA (available at github.com/SigmaHQ/sigma) or Yara (available at virustotal.github.io/yara) to determine whether the command line is associated with known malware or SIEM threats. The identification of such a signature for the command line can be provided to the generative natural language model as input to enhance the generation of the human-readable description.

FIG. 10A is a diagram of another exemplary input dataset for generating human-readable explanations of command lines using the generative natural language model of the malicious content detector as described above. As shown in FIG. 10A, the input dataset comprises a command line 1000 to be analyzed by the model, a tag 1010 (i.e., the signature identified from the signature-based rules) and target content 1020 in the form of an autocomplete prompt that the model will use to generate the human-readable description for the input command line 1000. In this example, the tag 1010 comprises a text string that can be interpreted by the model as context for the human-readable description, and the target content comprises a text string "The above command will" that informs the model to provide an explanation of the activity undertaken when the command line is executed. The input dataset is provided to the generative natural language model.

The generative natural language model analyzes the command line 1000 and tag 1010 and performs an autocomplete task to predict the next words for the target content prompt 1020. As shown in FIG. 10B, the model has used the prompt to generate a human-readable description 1020 of what the command line 1000 is expected to do upon execution, with the understanding of the context provided by the tag 1010. The generative natural language model returns the human-readable description 1020 to, e.g., the processor 502 of the security recognition device 500. Upon receiving the human-readable description, the processor 502 of the security recognition device 500 can provide the description to, e.g., a computing device of a SOC analyst for analysis and remediation if necessary.

As can be appreciated, due to the complex nature of certain command lines, in some situations the generative natural language model may be configured to create a plurality of candidate human-readable descriptions that must be further analyzed in order to select a description for actioning. For example, when presented the following exemplary command line:

cmd.exe/ccopy C:\Windows\System32\rund1132.exe CAUsers\PCs\AppData\Local\Temp\adobe.exe the model can return the following exemplary human-readable descriptions:
1) The above command will copy rund1132.exe file and paste it in C:\Users\PCs\AppData\Local\Temp folder where attackers can use the rund1132.exe to perform malicious activity.
2) The above command will copy rund1132.exe file to C:\Users\PCs\AppData\Local\Temp\adobe.exe where attackers can use the rund1132.exe to perform malicious activity.

Therefore, it is beneficial to analyze each of the candidate human-readable descriptions generated by the model to determine which description is more accurate, has better information coverage, and so forth. In some implementations, the malicious content detector described herein can be configured to perform back-translation of one or more candidate human-readable descriptions generated by the model to identify the best candidate description for further processing.

Figure 11:
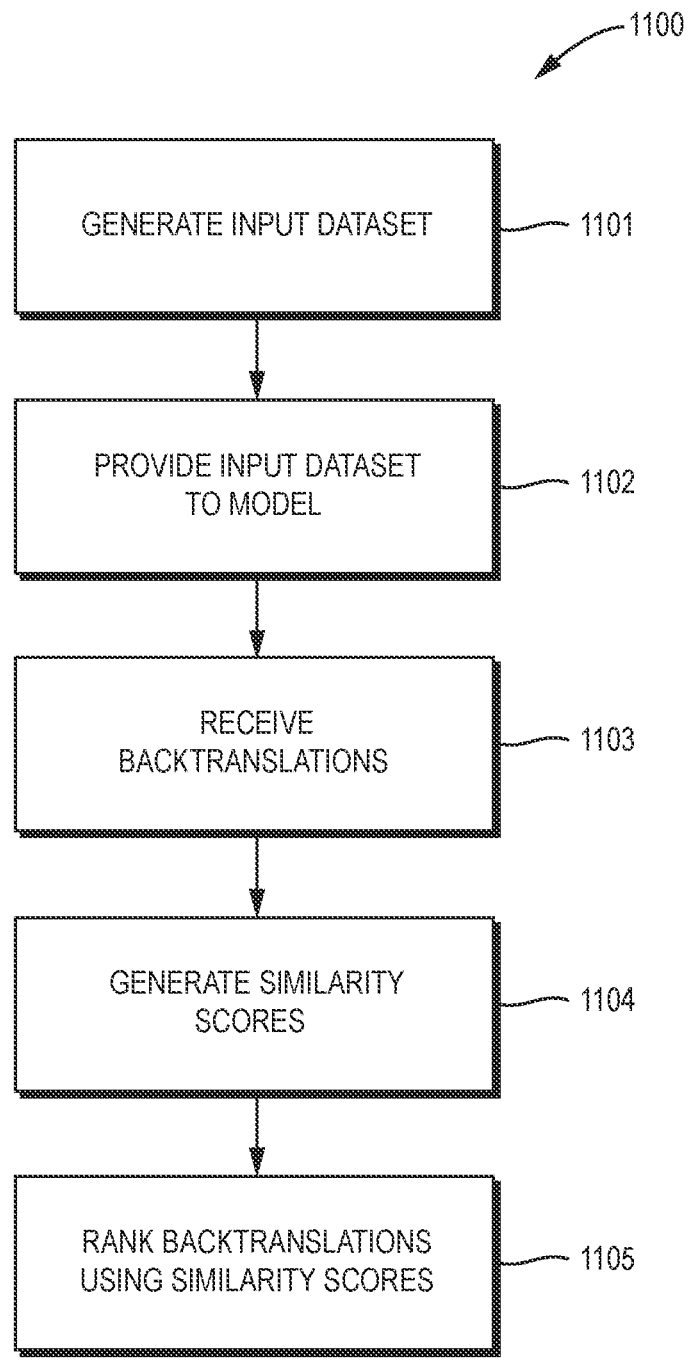
FIG. 11 illustrates a flow diagram of a method, in accordance with an example embodiment, of back-translating and ranking candidate human-readable descriptions.
Figure 12A:
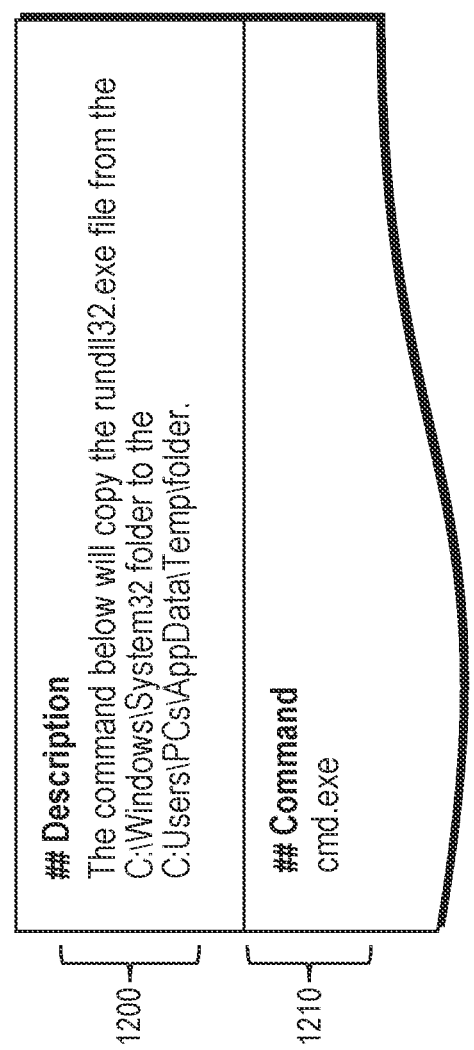
FIGS. 12A & 12B illustrate an input dataset, in accordance with an example embodiment, for performing back-translation.

Generally, to perform back-translation the malicious content detector can utilize a second type of generative natural language model that is trained on the generation of software code from natural language descriptions, such as Codex available from OpenAI, to translate the natural language descriptions into command line strings. FIG. 11 is a flow diagram of a computerized method 1100 of back-translating and ranking of candidate human-readable descriptions generated by the model. At block 1101, an input dataset is generated comprising a human-readable description of a command line (e.g., as previously generated by a model—see FIGS. 9A-9B and 10A-10B above), one or more signature tags, and a prompt provided from the originally-analyzed command line to guide the model to generate relevant code. FIG. 12A is a diagram of an exemplary input dataset for performing back-translation. As shown in FIG. 12A, the input dataset includes a human-readable description 1200, a tag 1210, and a prompt 1220 (i.e., cmd.exe) that serves as the autocomplete task for the model.

Figure 12B:
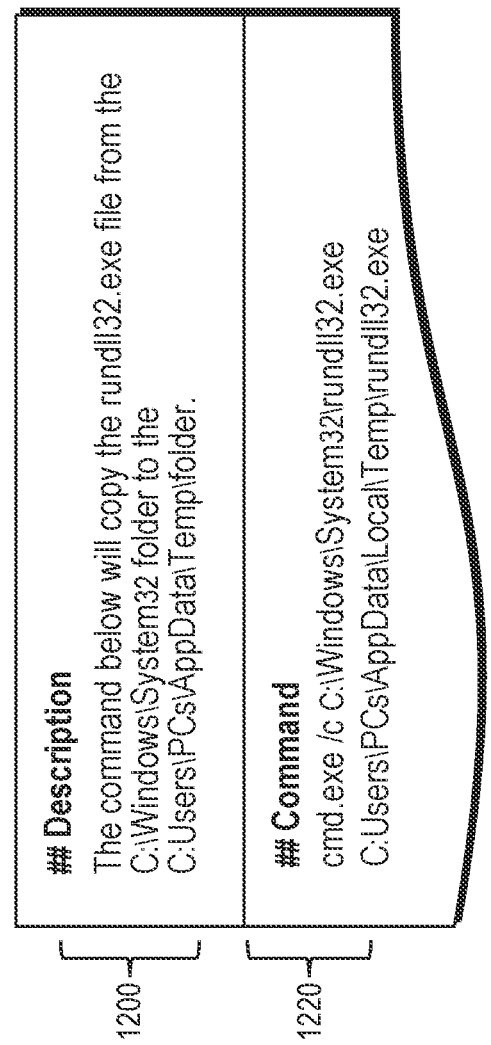

Turning back to FIG. 11, at block 1102 the input dataset is provided to the generative natural language model. The model analyzes the description 1200 and tag(s) 1210 and performs an autocomplete task to predict the next words for the target content prompt 1220 (i.e., cmd.exe). As shown in FIG. 12B, the model has generated a back-translated command line 1230 based upon its interpretation of the description 1200 and tag 1210. At block 1103, the back-translations of the input description is received for analysis.

Figure 13:
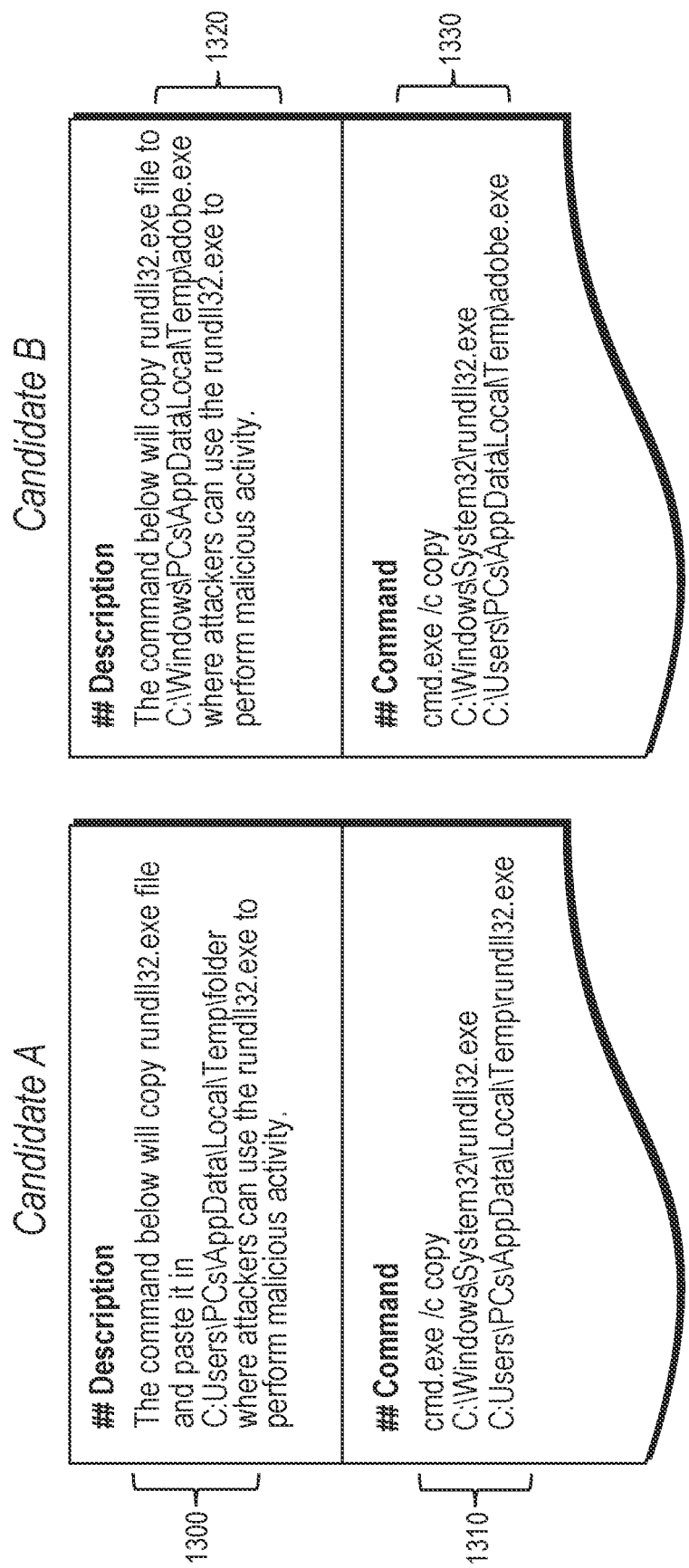
FIG. 13 illustrates backtranslation output generated for each of two different input datasets, in accordance with example embodiments.

In some embodiments, the model is configured to generate a plurality of candidate command lines using different human-readable descriptions that were previously created for the original command line (as noted above). FIG. 13 is a diagram of exemplary backtranslation output generated by the model for each of two different input datasets. As shown in FIG. 13, the model has generated a first candidate command line 1310 from a first human-readable description 1300 (Candidate A) and a second candidate command line 1330 from a second human-readable description 1320 (Candidate B).

Continuing with FIG. 11, at block 1104 each of the candidate command lines is compared against the original command line to generate a similarity score for each candidate command line. In some implementations, the similarity score is calculated using any of a number of string metrics including but not limited to: simple techniques such as Levenshtein distance and more advanced techniques such as TF-IDF and cosine similarity.

Figure 14:
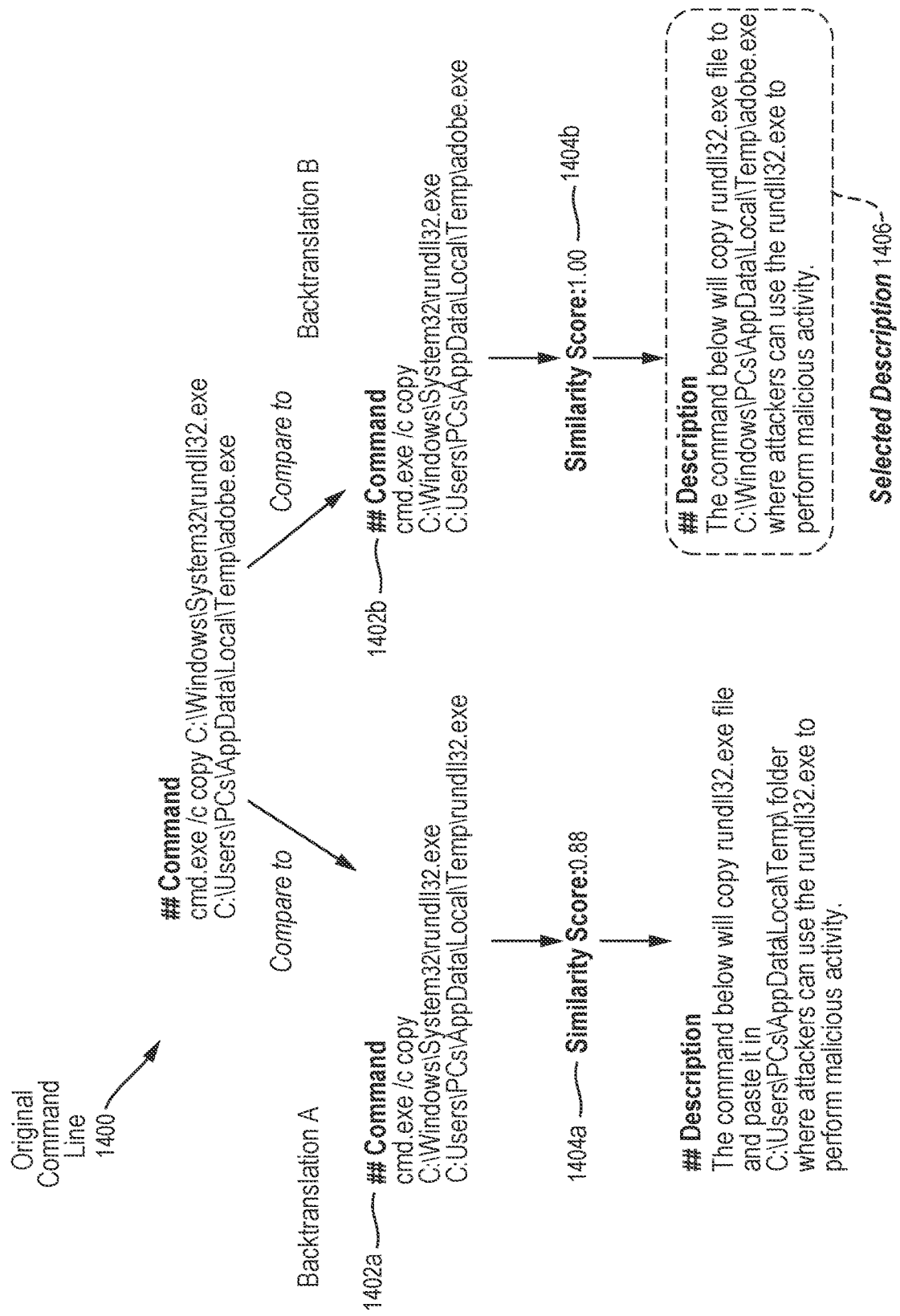
FIG. 14 illustrates an exemplary ranking of back-translated command lines, in accordance with an example embodiment.

Once the similarity scores are calculated, at block 1104, the candidate backtranslations are ranked according to the similarity scores and the ranked list is provided to, e.g., a SOC analyst for selection of the best candidate. FIG. 14 is a diagram of an exemplary ranking of back-translated command lines. As shown in FIG. 14, the original command line 1400 from which the candidate human-readable descriptions were generated is compared with the candidate command lines 1402*a*, 1402*b* generated through backtranslation. The result of each comparison is a corresponding similarity score 1404*a*, 1404*b*. In this example, Backtranslation A 1402*a* has a similarity score of 0.88 with the original command line (it is very similar, but has one difference), while Backtranslation B 1402*b* has a similarity score of 1.00 with the original command line (it is an exact match). Because Backtranslation B 1402*b* has a higher similarity score, the corresponding description 1406 is selected for display to the SOC analyst.

It should be appreciated that the above use cases are exemplary, and that other applications of the technology described herein can be contemplated.

Figure 15:
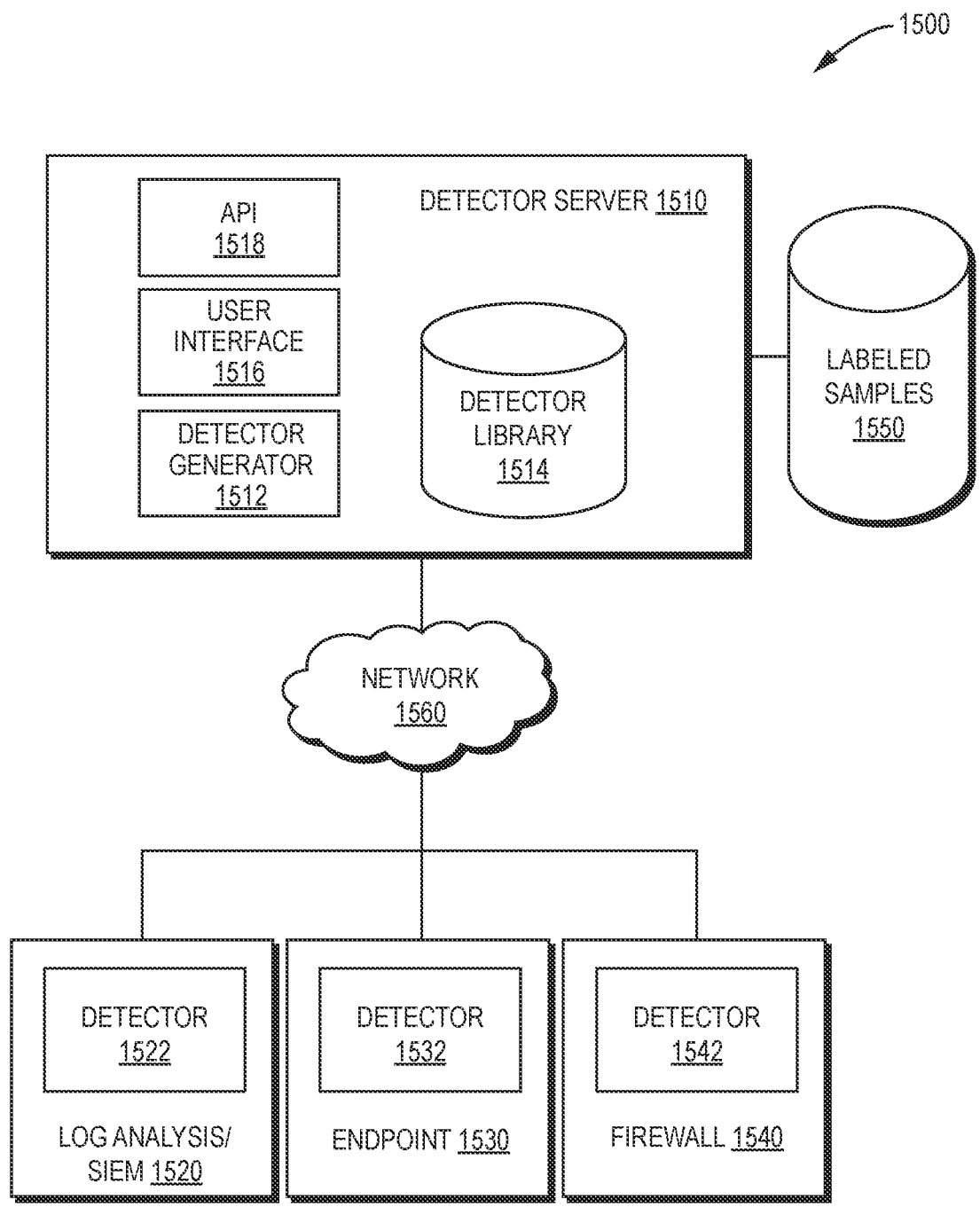
FIG. 15 illustrates a cybersecurity system, according to an embodiment.

As mentioned above, the malicious content detector technology can be deployed to any number of different computing systems and/or devices in order to realize the content detection and threat mitigation benefits described herein. Referring to FIG. 15, a cybersecurity system 1500 includes a detector server 1510 in communication with exemplary devices (e.g., Log Analysis/SIEM system 1520, Endpoint 1530, Firewall 1540) which devices (1520, 1530, 1540) that have a detector capability (1522, 1532, 1542). The SIEM 1520, Endpoint 1530, and Firewall 1540 are intended to be exemplary devices representative of devices that may be part of a given enterprise network. In a typical network there may be many different devices of different types and they may be connected in a variety of network configurations. As shown, each of the devices (1520, 1530, 1540) may be configured with the same or a different detectors (1522, 1532, 1542) as part of their security protection. Detectors provided by the Detector Server 1510 may be used as the Detectors (1522, 1532, 1542) to perform malicious content recognition tasks.

The detector server 1510 may be implemented on any suitable device or compute instance. For example, the detector server 1510 may be implemented on a server computer. The detector server 1510 may be implemented in a cloud compute instance. The detector server 1510 may be implemented on one of the devices (1520, 1530, 1540). The detector server 1510 may be in communication with one or more of the devices (1520, 1530, 1540) over a computer network 1560.

The detector server 1510 may store detectors as described herein. The detector server 1510 may store labeled samples 1550 that may be used to create detectors. The detector server 1510 may be implemented as a service for providing detectors as requested by a user. For example, a user may provide or direct the detector server 1510 to provide labeled samples available in the collection of labeled samples 1550 or via the network 1560. A user or a device (e.g., 1520, 1530, 1540) may request a detector. The user or device may specify the type of detector, for example, based on a type of content, a type of attack, or other suitable type.

The detector server 1510 may have access to a collection of labeled samples 1550, which may be used for generation of a detector. For example, the labeled samples 1550 may include malicious content and benign content.

The detector server 1510 may include a detector generator 1512 for generating detectors as described herein. The detector generator 1512 may generate a detector using specified labeled samples, natural language model configurations, output interpreters, and other elements, where the detector may be targeted for a given environment (1522, 1532, 1542). The detector generator 1512 may generate a detector for use as detector in a given system or environment.

The detector server 1510 may include a detector library 1514 for storing detectors generated by the detector generator 1510 as well as detectors generated by other means. For example, the detector library 1514 may include detectors that were previously developed. If a detector already exists, detector generator 1512 may provide a detector for a given target system based on an existing detector in the detector library 1514. The detector library 1514 may include detector elements that have previously been developed for a given detector, so that they can be provided to a user right away if they have been developed previously.

The detector generator 1510 may include a user interface 1516 which may be used by a user to provide or direct the detector generator 1510 to labeled samples, for example, in the collection of labeled samples 1550 or to add to the collection of labeled samples 1550. The user interface 1516 may be used by a user to request generation of a detector. The user interface 1516 may be used by a user to download a detector that has been generated. The user interface 1516 may be used by a user to request a detector update, for example with additional labeled samples 1550.

The detector generator 1510 may include an application programming interface (API) 1518 that allows for programmatic interaction with the detector generator 1510. The functionality of the user interface 1516 also may be available to a user via the API 1518 so that other systems may provide a user interface. The API 1518 allows for automatic or machine interaction to request a detector to be generated by the detector generator 1512. For example, if suspicious content is detected by the STEM 1520, the endpoint 1530 or the Firewall 1540, the device (1520, 1530, 1540) may provide the suspicious content to the detector generator 1512, with a request to generate a detector to detect the suspicious content. The detector then may be provided to the device (e.g., 1520, 1530, 540) that requested it as well as to other devices (1520, 1530, 1540).

In some implementations, a user may access the user interface 1516 and/or the API 1518 to provide the detector generator 1510 with analysis objects. For example, the analysis objects may be samples of malicious content identified by the user. The user may request or have previously configured via the user interface 1516 or the API 1518 target devices (1520, 1530, 1540) that are in the user's network for which the detector is desired. The user may request one or more detectors from the detector generator configured for the target device(s) (e.g., 1520, 1530, 1540) to detect the target analysis objects. The detector generator 1512 may use a library of labeled samples 1550, for example, a library of benign analysis objects, and generate a detector as described here. In some implementations, labeled samples may be selected based on a target environment. In some implementations, samples used in the detector may be selected based on the target devices (1520, 1530, 1540).

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random-access memory associated with a processor), or a storage device such as a disk drive, flash memory or any other optical, electromagnetic, magnetic, infrared or other device or combination of devices. In another aspect, any of the systems and methods described above may be embodied in any suitable transmission or propagation medium carrying computer-executable code and/or any inputs or outputs from same.

It will be appreciated that the devices, systems, and methods described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context. So, for example, performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity and need not be located within a particular jurisdiction.

It should further be appreciated that the methods above are provided by way of example. Absent an explicit indication to the contrary, the disclosed steps may be modified, supplemented, omitted, and/or re-ordered without departing from the scope of this disclosure.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A computerized method of detecting malicious content in text messages using generative natural language processing, the method comprising:
    generating, by a computing device, a number of sample text messages from a corpus of stored text messages by selecting first one or more text messages classified as malicious and selecting second one or more text messages classified as benign;
    identifying, by the computing device, one or more target text messages to be labeled as malicious or benign, the target text messages received from a remote device;
    providing, by the computing device, the number of sample text messages, the target text messages, and a task description to a generative natural language model programming interface in a format compatible as input to a generative natural language model, the model comprising a transformer-based neural network architecture trained to generate text output using an input prompt;
    causing, by the computing device, the generative natural language model to generate a predicted label for each of the target text messages by comparing one or more features of the target text messages to one or more features of the classified sample text messages, wherein the task description comprises an instruction to the generative natural language model to guide analysis of the sample text messages and generation of the predicted label for each of the target text messages; and
    executing, by the computing device, a security action directed to one or more of the target text messages when the predicted label for the target text message indicates that the target text message is malicious.

2. The method of claim 1, wherein the security action comprises blocking the content, quarantining the content, alerting an administrator, alerting an analyst, or designating the content for additional analysis.

3. The method of claim 1, wherein each sample text message classified as malicious is assigned a first label, and each sample text message classified as benign is assigned a second label.

4. The method of claim 3, wherein providing the number of sample text messages and the target text messages to the generative natural language model programming interface comprises providing the labels associated with each of the sample text messages to the generative natural language model programming interface.

5. A system for detecting malicious content in text messages using generative natural language processing, the system comprising a computing device having one or more memories for storing computer executable instructions and one or more processors that execute the computer executable instructions to:
   generate a number of sample text messages from a corpus of stored text messages by selecting first one or more text messages classified as malicious and selecting second one or more text messages classified as benign;
   identify one or more target text messages to be labeled as malicious or benign, the target text messages received from a remote device;
   provide the number of sample text messages, the target text messages, and a task description to a generative natural language model programming interface in a format compatible as input to a generative natural language model, the model comprising a transformer-based neural network architecture trained to generate text output using an input prompt;
   cause the generative natural language model to generate a predicted label for each of the target text messages by comparing one or more features of the target text messages to one or more features of the classified sample text messages, wherein the task description comprises an instruction to the generative natural language model to guide analysis of the sample text messages and generation of the predicted label for each of the target text messages; and
   execute a security action directed to one or more of the target text messages when the predicted label for the target text message indicates that the target text message is malicious.

6. The system of claim 5, wherein the security action comprises blocking the content, quarantining the content, alerting an administrator, alerting an analyst, or designating the content for additional analysis.

7. The system of claim 5, wherein each sample text message classified as malicious is assigned a first label, and each sample text message classified as benign is assigned a second label.

8. The system of claim 7, wherein providing the number of sample text messages and the target text messages to the generative natural language model programming interface comprises providing the labels associated with each of the sample text messages to the generative natural language model programming interface.

9. A computerized method for translating command line code using generative natural language processing, the method comprising:
   analyzing, by a computing device, target command line code to identify one or more tags for the target command line code;
   providing, by the computing device, the target command line code and the tags to a generative natural language model programming interface in a format compatible as input to a generative natural language model, the model comprising a transformer-based neural network architecture trained to generate text output using an input prompt;
   causing, by the computing device, the generative natural language model to translate the target command line code and the tags into a natural language description of the target command line code;
   providing, by the computing device, the natural language description to a remote computing device;
   providing, by the computing device, the natural language description and the tags to the generative natural language model programming interface in a format compatible as input to the generative natural language model;
   causing, by the computing device, the natural language model to translate the natural language description and the tags into one or more command line code candidates;
   comparing, by the computing device, the target command line code and each of the command line code candidates using a similarity measure; and
   ranking, by the computing device, the command line code candidates based upon the similarity measures.

10. The method of claim 9, further comprising providing, by the computing device, a command identifier along with the natural language description and the tags to the generative natural language model programming interface.

11. The method of claim 10, wherein the command identifier guides the generative natural language model during generation of the command line code candidates.

12. A computer system for translating command line code using generative natural language processing, the system comprising one or more memories for storing computer-executable instructions and one or more processors that execute the computer-executable instructions to:
   analyze target command line code to identify one or more tags for the target command line code;
   provide the target command line code and the tags to a generative natural language model programming interface in a format compatible as input to a generative natural language model, the model comprising a transformer-based neural network architecture trained to generate text output using an input prompt;
   cause the generative natural language model to translate the target command line code and the tags into a natural language description of the target command line code;
   provide the natural language description to a remote computing device;
   provide the natural language description and the tags to the generative natural language model programming interface in a format compatible as input to the generative natural language model;
   cause the natural language model to translate the natural language description and the tags into one or more command line code candidates;
   compare the target command line code and each of the command line code candidates using a similarity measure; and
   rank the command line code candidates based upon the similarity measures.

13. The system of claim 12, wherein the computing device provides a command identifier along with the natural language description and the tags to the generative natural language model programming interface.

14. The system of claim 13, wherein the command identifier guides the generative natural language model during generation of the command line code candidates.

\* \* \* \* \*